United States Patent
Osmanow et al.

(10) Patent No.: US 6,862,307 B2
(45) Date of Patent: Mar. 1, 2005

(54) ELECTRICAL EXCITATION CIRCUIT FOR A PULSED GAS LASER

(75) Inventors: Rustem Osmanow, Rosdorf (DE); Uwe Stamm, Goettingen (DE); Andreas Targsdorg, Klein Schneen (DE)

(73) Assignee: Lambda Physik AG, Goettingen (DE)

( * ) Notice: Subject to any disclaimer, the term of this patent is extended or adjusted under 35 U.S.C. 154(b) by 248 days.

(21) Appl. No.: 09/858,147

(22) Filed: May 14, 2001

(65) Prior Publication Data

US 2002/0015430 A1 Feb. 7, 2002

Related U.S. Application Data

(60) Provisional application No. 60/204,095, filed on May 15, 2000.

(51) Int. Cl.[7] .............................. H01S 3/00; H01S 3/22
(52) U.S. Cl. ...................... 372/38.03; 372/55; 372/57
(58) Field of Search ........................... 372/38.1, 38.03, 372/55, 57

(56) References Cited

U.S. PATENT DOCUMENTS

| | | | |
|---|---|---|---|
| 3,858,056 A | 12/1974 | Melamed et al. | 307/88.3 |
| 3,962,576 A | 6/1976 | Kuhl et al. | 250/201 |
| 4,240,044 A | 12/1980 | Fahlen et al. | 331/94.5 PE |
| 4,380,079 A | 4/1983 | Cohn et al. | 372/87 |
| 4,393,505 A | 7/1983 | Fahlen | 372/57 |
| 4,399,540 A | 8/1983 | Bücher | 372/20 |
| 4,611,270 A | 9/1986 | Klauminzer et al. | 364/183 |
| 4,616,908 A | 10/1986 | King | 350/576 |
| 4,686,682 A | 8/1987 | Haruta et al. | 372/87 |
| 4,691,322 A | 9/1987 | Nozue et al. | 372/82 |
| 4,718,072 A | 1/1988 | Marchetti et al. | 372/86 |
| 4,719,637 A | 1/1988 | Cavioli et al. | 372/59 |
| 4,763,093 A | 8/1988 | Cirkel et al. | 336/58 |
| 4,797,888 A | 1/1989 | Klopotek | 372/38.05 |

(List continued on next page.)

FOREIGN PATENT DOCUMENTS

| | | | |
|---|---|---|---|
| DE | 38 42 492 A1 | 6/1990 | H01S/3/097 |
| DE | 44 01 892 A1 | 1/1994 | H01S/3/038 |
| DE | 298 22 090 | 3/1999 | H01S/3/08 |
| EP | 0 532 751 | 2/1991 | H01S/3/038 |
| EP | 0 532 751 A1 | 2/1991 | H01S/3/038 |
| GB | 2 267 790 A | 12/1993 | H03K/3/57 |
| JP | 61-91982 | 10/1984 | H01S/3/03 |
| JP | 61-116889 | 10/1984 | |
| JP | 3009582 A | 1/1991 | H01S/3/038 |
| WO | WO 96/25778 | 8/1996 | H01S/3/00 |

OTHER PUBLICATIONS

Kakehata et al., "Gain and Saturation Intensity Measurements of a Discharge Pumped F2 laser at High Excitation Rates", Applied Physics Letters, vol. 61 No. 26, Dec. 28, 1992.*

(List continued on next page.)

*Primary Examiner*—Minsun Oh Harvey
*Assistant Examiner*—James Menefee
(74) *Attorney, Agent, or Firm*—Stallman & Pollock LLP

(57) ABSTRACT

Method and system for providing an excimer or molecular fluorine laser including a laser tube filled with a laser gas surrounded by an optical resonator, where the laser tube has multiple electrodes including a pair of main discharge electrodes connected to a discharge circuit for exciting the laser gas to produce a laser output beam. The discharge circuit has an all solid state switch and preferably does not include a transformer. The solid state switch includes multiple solid state devices that may be capable of switching voltages in excess of 12 kV, such as 14–32 kV or more, or the voltage needed to switch the laser. The series of switches has a rise time of approximately less than 300 ns, and preferably around 100 ns or less. The switch may be capable of switching voltages of slightly more than half, but less than the entire voltage needed to produce laser pulses of desired energies, and a voltage doubling circuit may be used to produce the voltage required to produce the desired output pulse energies. An oscillator-amplifier configuration may be used, wherein an oscillator switch may be capable of switching voltages less than the entire voltage needed to produce the desired laser pulse energies, while the amplifier amplifies the pulses to the desired pulse energies.

49 Claims, 7 Drawing Sheets

100

U.S. PATENT DOCUMENTS

| | | | |
|---|---|---|---|
| 4,829,536 A | 5/1989 | Kajiyama et al. | 372/57 |
| 4,856,018 A | 8/1989 | Nozue et al. | 372/99 |
| 4,860,300 A | 8/1989 | Bäumler et al. | 372/57 |
| 4,891,818 A | 1/1990 | Levatter | 372/57 |
| 4,905,243 A | 2/1990 | Lokai et al. | 372/32 |
| 4,926,428 A | 5/1990 | Kajiyama et al. | 372/20 |
| 4,953,174 A | 8/1990 | Eldridge et al. | 372/87 |
| 4,975,919 A | 12/1990 | Amada et al. | 372/33 |
| 4,977,563 A | 12/1990 | Nakatani et al. | 372/32 |
| 4,977,573 A | 12/1990 | Bittenson et al. | 372/81 |
| 4,983,859 A | 1/1991 | Nakajima et al. | 307/419 |
| 5,025,445 A | 6/1991 | Anderson et al. | 372/20 |
| 5,090,021 A | 2/1992 | Nakatani et al. | 372/86 |
| 5,093,832 A | 3/1992 | Bethune et al. | 372/21 |
| 5,095,492 A | 3/1992 | Sandstrom | 372/102 |
| 5,142,543 A | 8/1992 | Wakabayashi et al. | 372/32 |
| 5,150,370 A | 9/1992 | Furuya et al. | 372/106 |
| 5,177,754 A | 1/1993 | Ball et al. | 372/38 |
| 5,181,217 A | 1/1993 | Sato et al. | 372/38 |
| 5,221,823 A | 6/1993 | Usui | 219/121.78 |
| 5,226,050 A | 7/1993 | Burghardt | 372/20 |
| 5,247,531 A | 9/1993 | Müller-Horsche | 372/38 |
| 5,247,534 A | 9/1993 | Müller-Horsche | 372/58 |
| 5,247,535 A | 9/1993 | Müller-Horsche et al. | 372/86 |
| 5,305,338 A | 4/1994 | Wakata et al. | 372/38 |
| 5,309,462 A | 5/1994 | Taylor et al. | 372/38 |
| 5,313,481 A | 5/1994 | Cook et al. | 372/37 |
| 5,319,665 A | 6/1994 | Birx | 372/69 |
| 5,337,330 A | 8/1994 | Larson | 372/86 |
| 5,365,366 A | 11/1994 | Kafka et al. | 359/330 |
| 5,396,514 A | 3/1995 | Voss | 372/57 |
| 5,404,366 A | 4/1995 | Wakabayashi et al. | 372/29 |
| 5,427,531 A | 6/1995 | Kramer | 434/302 |
| 5,448,580 A | 9/1995 | Birx et al. | 372/38 |
| 5,450,207 A | 9/1995 | Fomenkov et al. | 356/416 |
| 5,463,650 A | 10/1995 | Ito et al. | 372/57 |
| 5,535,233 A | 7/1996 | Mizoguchi et al. | 372/87 |
| 5,557,629 A | 9/1996 | Mizoguchi et al. | 372/87 |
| 5,559,584 A | 9/1996 | Miyaji et al. | 355/73 |
| 5,559,815 A | 9/1996 | Berger et al. | 372/25 |
| 5,559,816 A | 9/1996 | Basting et al. | 372/57 |
| 5,586,134 A | 12/1996 | Das et al. | 372/38 |
| 5,596,596 A | 1/1997 | Wakabayashi et al. | 372/102 |
| 5,638,388 A | 6/1997 | Nighan, Jr. et al. | 372/22 |
| 5,659,419 A | 8/1997 | Lokai et al. | 359/330 |
| 5,663,973 A | 9/1997 | Stamm et al. | 372/20 |
| 5,684,822 A | 11/1997 | Partlo | 372/95 |
| 5,710,787 A | 1/1998 | Amada et al. | 372/25 |
| 5,729,562 A | 3/1998 | Birx et al. | 372/38 |
| 5,729,565 A | 3/1998 | Meller et al. | 372/87 |
| 5,748,346 A | 5/1998 | David et al. | 359/15 |
| 5,754,579 A | 5/1998 | Mizoguchi et al. | 372/58 |
| 5,761,236 A | 6/1998 | Kleinschmidt et al. | 372/100 |
| 5,763,855 A | 6/1998 | Shioji | 219/121.84 |
| 5,771,258 A | 6/1998 | Morton et al. | 372/57 |
| 5,802,094 A | 9/1998 | Wakabayashi et al. | 372/57 |
| 5,811,753 A | 9/1998 | Weick et al. | 219/121.78 |
| 5,815,386 A * | 9/1998 | Gordon | 363/50 |
| 5,818,865 A | 10/1998 | Watson et al. | 372/86 |
| 5,835,520 A | 11/1998 | Das et al. | 372/57 |
| 5,847,861 A | 12/1998 | Kafka et al. | 359/330 |
| 5,852,627 A | 12/1998 | Ershov | 372/108 |
| 5,854,802 A | 12/1998 | Jin et al. | 372/22 |
| 5,856,991 A | 1/1999 | Ershov | 372/57 |
| 5,898,718 A | 4/1999 | Mohatt et al. | 372/22 |
| 5,898,725 A | 4/1999 | Fomenkov et al. | 372/102 |
| 5,901,163 A | 5/1999 | Ershov | 372/20 |
| 5,914,974 A | 6/1999 | Partlo et al. | 372/38 |
| 5,917,849 A | 6/1999 | Ershov | 372/102 |
| 5,923,693 A | 7/1999 | Ohmi et al. | 372/57 |
| 5,936,988 A | 8/1999 | Partlo et al. | 372/38 |
| 5,940,421 A | 8/1999 | Partlo et al. | 372/38 |
| 5,946,337 A | 8/1999 | Govorkov et al. | 372/92 |
| 5,949,806 A | 9/1999 | Ness et al. | 372/38 |
| 5,970,082 A | 10/1999 | Ershov | 372/102 |
| 5,978,391 A | 11/1999 | Das et al. | 372/20 |
| 5,978,394 A | 11/1999 | Newman et al. | 372/32 |
| 5,978,405 A | 11/1999 | Juhasz et al. | 372/57 |
| 5,978,406 A | 11/1999 | Rokni et al. | 372/58 |
| 5,978,409 A | 11/1999 | Das et al. | 372/100 |
| 5,982,795 A | 11/1999 | Rothweil et al. | 372/38 |
| 5,982,800 A | 11/1999 | Ishihara et al. | 372/57 |
| 5,991,324 A | 11/1999 | Knowles et al. | 372/57 |
| 5,999,318 A | 12/1999 | Morton et al. | 359/572 |
| 6,002,697 A | 12/1999 | Govorkov et al. | 372/34 |
| 6,005,880 A | 12/1999 | Basting et al. | 372/38 |
| 6,014,206 A | 1/2000 | Basting et al. | 356/138 |
| 6,014,398 A | 1/2000 | Hofmann et al. | 372/60 |
| 6,016,325 A | 1/2000 | Ness et al. | 372/38 |
| 6,018,537 A | 1/2000 | Hofmann et al. | 372/25 |
| 6,020,723 A | 2/2000 | Desor et al. | 320/166 |
| 6,028,872 A | 2/2000 | Partlo et al. | 372/38 |
| 6,028,880 A | 2/2000 | Carlesi et al. | 372/58 |
| 6,055,161 A * | 4/2000 | Church et al. | 363/22 |
| 6,061,382 A | 5/2000 | Govorkov et al. | 372/101 |
| 6,081,542 A | 6/2000 | Scaggs | 372/70 |
| 6,084,897 A | 7/2000 | Wakabayashi et al. | 372/38 |
| 6,097,311 A | 8/2000 | Iwasaki et al. | 372/57 |
| 6,128,323 A | 10/2000 | Myers et al. | 372/38 |
| 6,151,346 A | 11/2000 | Partlo et al. | 372/38 |
| 6,154,470 A | 11/2000 | Basting et al. | 372/19 |
| 6,157,662 A | 12/2000 | Scaggs | 372/60 |
| 6,160,831 A | 12/2000 | Kleinschmidt et al. | 372/57 |
| 6,160,832 A | 12/2000 | Kleinschmidt et al. | 372/57 |
| 6,163,559 A | 12/2000 | Watson | 372/102 |
| 6,198,761 B1 | 3/2001 | von Bergmann et al. | 372/86 |
| 6,212,214 B1 | 4/2001 | Vogler et al. | 372/59 |
| 6,219,368 B1 | 4/2001 | Govorkov | 372/59 |
| 6,226,307 B1 | 5/2001 | Desor et al. | 372/37 |
| 6,243,405 B1 | 6/2001 | Borneis et al. | 372/57 |
| 6,243,406 B1 | 6/2001 | Heist et al. | 372/59 |
| 6,269,110 B1 | 7/2001 | Leinhos et al. | 372/57 |
| 6,282,221 B1 | 8/2001 | Ohmi et al. | 372/57 |
| 6,298,080 B1 | 10/2001 | Heist et al. | 372/99 |
| 6,324,196 B1 | 11/2001 | Desor | 372/30 |

OTHER PUBLICATIONS

G.J. Ernst, "Uniform–Field Electrodes with Minimum Width," *Optics Communications*, vol. 49, No. 4, Mar. 15, 1984, pp. 275–277.

D. Basting, et al., "Thyratrons with Magnetic Switches: The Key to Reliable Excimer Lasers," *Laser and Optoelektronik*, No. 2, 1984, pp. 128–131.

Marchetti, et al., "A New Type of Corona–Discharge Photoionization Source for Gas Lasers," *J. Appl. Phys.* vol. 56, No. 11, Dec. 1984, pp. 3163–3168.

T. Shimada, et al., "An All Solid–state Magnetic Switching Exciter for Pumping Excimer Lasers," *Rev. Sci. Instrum.* vol. 56, No. 11, 1985.

T. Shimada et al., "Semiconductor Switched Magnetic Modulator for Rep–Rate Lasers," *IEEE Pulse Conference*, Crystal City, Virginia, Jun. 10–12, 1985, 4 pages in length.

Kobayashi, O., et al., "High Power Repetitive Excimer Lasers Pumped by an All Solid State Magnetic Exciter," *SPIE*, vol. 622, 1986, pp. 111–117.

Baker, H.J., et al., Magnetic Switching Circuits for Variable High Voltage Pulse Delays and Gas–Laser Synchronisation, *The Institute of Physics*, 1986, pp. 149–152.

Bakert, H.J., et al., "An Efficient Laser Pulser Using Ferrite Magnetic Switches," *IOP Publishing*, 1988, pp. 218–224.

Keet, A.L., et al., "High Voltage Solid State Pulser for High Repetition–Rate Gas Lasers," *EPE Aichen*, 1989, 4 pages.

I. Smilanski, "Reducing Thyraton Losses in CVL Modulator," *Conference Record, 19th Power Modulator Conference.*, 1990, San Diego, CA, pp. 287–289.

Greenwood, et al., "An Optimisation Strategy for Efficient Pulse Compression," *IEEE*, Sep. 1990, 9pp. 187–191.

Dr. D. Basting, "Industrial Excimer Lasers," 2nd Edition, 1991.

Patent Abstract of Japan: Publication No.: 04109684, Application. No.: 02226623, Oct. 4, 1992, 1 page.

von Bergmann, et al., "Thyristor–driven Pulsers for Multi-kilowatt Average Power Lasers," *IEE Proceedings–B*, vol. 139, No. 2, Mar. 1992, pp. 123–130.

Druckmann, H.M., et al., "A New Algorithm for the Design of Magnetic Pulse Compressors," *IEEE*, Jul. 1992, 99. 213–216.

Handbook of Transformer Design and Applications, by William M. Flanagan, 2nd Edition, 1993: Chapter 10: Design Procedures, pp. 10.1–10.28.

Taylor, R.S., et al., "Pre–Ionization of a Long Optical Pulse Magnetic–Spiker Systainer XeCl Laser," *Rev. Sci. Instrum.* vol. 65, No. 12, Dec. 1994, pp. 3621–3627.

Taylor, R.S., et al., "Transmission Properties of Spark Preionization Radiation in Rare–Gas halide Laser gas Mixes," *IEEE Journal of Quantum Electronics*, vol. 31, No. 12, Dec. 1995, pp. 2195–2207.

F.W. Grover, Inductance Calculations, "Parallel Elements of Equal Length," New York, 1945, pp. 31–44.

Melville, W.S., "The Use of Saturable Reactors as Discharge Devices for Pulse Generators," *The Proceedings of the Institution of Electrical Engineers Part III*, vol. 98, 1951, pp. 185–206.

T.Y. Chang, "Improved Uniform–Field Electrode Profiles for TEA Laser and High Voltage Applications," *The Review of Scientific Instruments*, Apr. 1973, vol. 4., No. 4., pp. 405–407.

Birx, et al., "Regulation and Drive System for High Rep–Rate Magnetic Pulse Compressors," *Article prepared for submission to the 15th Power Modulator Symposium, Baltimore, Maryland*, Jun. 14–16, 1982, pp. 1–17.

Smilanski, I., et al., "Electrical Excitation of an XeCl Laser Using Magnetic Pulse Compression," *Appl. Phys. Lett.*, vol. 40, No. 7, Apr. 1, 1982, pp. 547–548.

E.A. Stappaerts, "A Novel Analytical Design Method for Discharge Laser Electrode Profiles," *Appl. Phys. Lett.*, Jun. 15, 1982, vol. 40, No. 12., p. 1018–1019.

Questek, "Magnetic Pulse Compression for Excimer Lasers," *Technical Notes No. 2*, May 1983.

Soldatov, et al., "Copper Vapor Laser with Stabilized Output Parameters," *Sov. J. Quantum Electron.*, Vol. 13, No. 5, May 1983, pp. 612–616.

Ernst G.J. et al., "Compact Uniform Field Electrode Profile," *Optics Communications*, vol. 47, No. 1, Aug. 1, 1983, pp. 47–51.

T. Efthimiopoulos, et al., "An Auto–pre–pulse and and Pre–ionization Long–pulse XeCl Laser," *Journal of Physics E. Scientific Instruments*, Feb. 6, 1995, No. 2, pp. 167–169.

V.M. Borisov et al., "Effects Limiting the Average Power of Compact Pulse–periodic KrF Lasers," *Quantum Electronics*, 1995, vol. 25., No. 5., pp. 421–425.

M. Jung, et al., "PFN's Switched with SCR's at 15 kV, 225J and 100 Hz Rep–Rate," *Proceedings of 22 nd International Power Modulator Symposium*, 1996, Boca Raton, FL, U.S.A., pp. 173–176.

Tatsumi Goto, et al., "Design Concept and Performance Consideration for Fast High Power Semiconductor Switching for High Power Excimer Laser," *Rev. Sci. Instrum.*, vol. 68, No. 7, Jul. 1997.

Enami et al., "High Spectral Pourity and High Durability kHZ KrF Excimer Laser with Advanced RF Pre–Ionization Discharge," *Proceedings of SPIE*, vol. 3334, Feb. 25–27, 1998, pp. 1031–1040.

Wakabayashi, et al., "Billion Level Durable ArF Excimer Laser with Highly Stable Energy," *SPIE 24thAnnual International Symposium on Microlithography, Santa Clara, CA*, May 14–19, 1999.

* cited by examiner

ELECTRICAL EXCITATION CIRCUIT FOR A PULSED GAS LASER

PRIORITY

This application claims priority under 35 USC §119 to provisional application No. 60/204,095 entitled "Electrical Excitation Circuit for a Pulsed Gas Laser" filed on May 15, 2000.

BACKGROUND OF THE INVENTION

1. Field of the Invention

The present invention relates to a discharge circuit for a pulsed gas laser system such as an excimer or a molecular fluorine laser system. In particular, the present invention relates to a circuit including a solid state switch for providing high voltage, short current pulses to the main laser discharge electrodes of the laser system.

2. Description of the Related Art

Pulsed gas discharge lasers, emitting in the deep ultraviolet (DUV) and vacuum ultraviolet (VUV) region are widely used in various industrial applications such as microlithography, photoablation, and micro-machining, among others. For microlithographic applications, currently used systems include line narrowed excimer lasers, such as ArF (193 nm) lasers and KrF (248 nm) lasers, as well as molecular fluorine ($F_2$) lasers emitting at 157 nm. It is desired that these lasers be efficient and exhibit high energy stability at high repetition rates, for example, at 1–2 KHz or more.

In many scientific, medical and industrial applications for excimer and molecular fluorine gas discharge lasers, it is important that the radiation pulses emitted exhibit stabilized output energy. That gas discharge conditions and characteristics may change, particularly during the operation of the laser, affects establishing constant energy of the emitted radiation. Characteristics and conditions of the gas discharge are dependent upon a number of parameters that, with adequate control, may allow significant improvements toward exact reproducibility.

In conventional pulsed gas discharge excimer lasers, a current pulse is generated by a pulser circuit connected to a power supply, and the current pulse is applied across a pair of main electrodes in a laser chamber filled with a laser active gas to excite the gas. As industrial applications evolve such that higher repetition rates of the laser pulses are desired, the laser discharge circuit has to provide faster current pulses. Moreover, the desired energies of the output laser pulses place constraints on the minimum voltage that is applied to the main discharge electrodes to produce the pulses.

High voltage thyratron switches have been used in the past in excimer laser pulsed power supply discharge circuits. Thyratron switches are capable of withstanding high voltages, for example approximately 50 kVolts, and are very fast (for example, approximately 100 nanoseconds). However, thyratron switches have the drawback that they are imprecise, incurring approximately 10% to 50% fluctuations in voltage, inconsistent with highly energy stabilized laser output pulses. Moreover, thyratrons suffer from having rather short life spans.

In contrast, solid state switches such as IGBTs, GTOs and thyristers are more precise and exhibit longer lifetimes as switching elements for excimer or molecular fluorine gas lasers. However, conventional solid state switches are typically relatively slow (for example, approximately 1 $\mu$second). At such low speeds, considerable jitter occurs, and voltage fluctuations are again unsatisfactory. Additionally, typical solid state switches are incapable of handling high voltages, for example, approximately 50 kVolts, or even moderate voltages of approximately 14 to 32 kVolts. Thus, in order for a discharge circuit using a low voltage solid state switch (for example, at approximately 4 to 7 kVolts), to supply sufficiently high current pulses to the electrodes of the laser, a step-up transformer may be used after the switch.

However, it is recognized herein that is would be advantageous to have a discharge circuit for an excimer or molecular fluorine laser which uses a solid state switch and that does not require a bulky transformer to produce current pulses of sufficient intensity for the discharge. Moreover, it is desired to have an excimer or a molecular fluorine laser that demonstrates high energy stability.

SUMMARY OF THE INVENTION

In view of the foregoing, in one aspect of the present invention, an excimer or molecular fluorine laser is provided with a discharge circuit for energizing the laser gas that exhibits high energy stability.

In another aspect of the present invention, an excimer or molecular fluorine laser is configured to exhibit short output pulses and sufficient laser output energies.

In a further aspect of the present invention, there is provided a discharge circuit for an excimer or molecular fluorine laser that has a fast, all solid state switch and not using a transformer to produce desired laser output energies, and that exhibits high energy stability.

An excimer or molecular fluorine laser in accordance with one embodiment includes a laser tube filled with a laser gas surrounded by an optical resonator, where the laser tube has multiple electrodes including a pair of main discharge electrodes connected to a discharge circuit for exciting the laser gas to produce a laser output beam. The discharge circuit has an all solid state switch which is configured to switch all of the voltage needed to be applied to the electrodes to produce laser pulses at desired pulse energies without connecting a step-up transformer in the circuit after the switch.

In a first aspect of the present invention, a solid state switch preferably comprising a series of solid state devices is used that is capable of switching voltages in excess of 12 kV, such as 14–32 kV or more, or the voltage needed to switch the laser. Since the switch is capable of handling all of the required voltage, a step-up transformer is not needed. The series of switches has a rise time of preferably less than 300 ns, and more preferably around 100 ns or less.

In a second aspect of the present invention, a solid state switch preferably comprising a series of solid state devices is used that is capable of switching voltages of at least half of the voltage needed to switch the laser. For example, if 20 kV is needed to switch the laser, then the solid state switch would be capable of handling at least 10 kV. A voltage doubling circuit may be provided after the solid state switch to double the voltage applied to the pulse compressor circuit before the pulse reaches the main discharge electrodes.

The voltage doubling circuit preferably includes a pair of capacitors each having a plate connected to the output of the switch. A first of the capacitors has its second plate connected to the pulse compressor and the second capacitor has its second plate grounded. When the switch closes, the first and second capacitors each acquire a voltage substantially the same as the voltage that the main initial storage capacitor has been charged to before the switch is closed. The sum of the voltages across the first and second capacitors is then double the switching voltage. Thus, the switching voltage need only be half the voltage needed to produce the current pulse at the main laser discharge electrodes.

In a third aspect of the present invention, a solid state switch preferably comprising a series of solid state devices is used. The switches are preferably connected to each of an oscillator laser discharge circuit and an amplifier laser discharge circuit. The electrical pulse applied to the amplifier laser discharge circuit is delayed from that applied to the oscillator laser discharge circuit. As a result, an output pulse from the oscillator laser can be optically directed into the laser tube of the amplifier laser at substantially the same time as when the electrical pulse is applied to the discharge circuit of the amplifier laser. The presence of the oscillator laser pulse in the discharge region of the amplifier laser at the time of the discharge of the amplifier laser serves to increase the output of the oscillator laser to the desired level. Thus, the voltage across the switch can be less than the voltage required to be applied to the discharge electrodes of the oscillator laser.

Preferably, the oscillator laser according to a further aspect of the present invention includes a line narrowing unit within its resonator. Also preferably, only one solid state switch is used. However, separate synchronized switches may alternatively be used for the amplifier and oscillator lasers. Additionally, separate power supplies may be used to provide the current pulses for the amplifier and oscillator laser discharges. Moreover, although one or more saturable cores are preferred for providing the delay between the discharges of the amplifier and oscillator lasers, other delay means are understood by those skilled in the art as capable of being substituted for the one or more saturable cores.

In addition, a discharge circuit for an excimer or molecular fluorine in accord with a preferred embodiment includes a solid state switch and a protective circuit connected in parallel with the solid state switch for protecting the solid state switch against negative currents flowing back through the discharge circuit. The protective circuit may be a diode or a resistor-capacitor series combination in preferred embodiments.

These and other features and advantages of the present invention will be understood upon consideration of the following detailed description of the invention and the accompanying drawings.

INCORPORATION BY REFERENCE

Figure 1A:
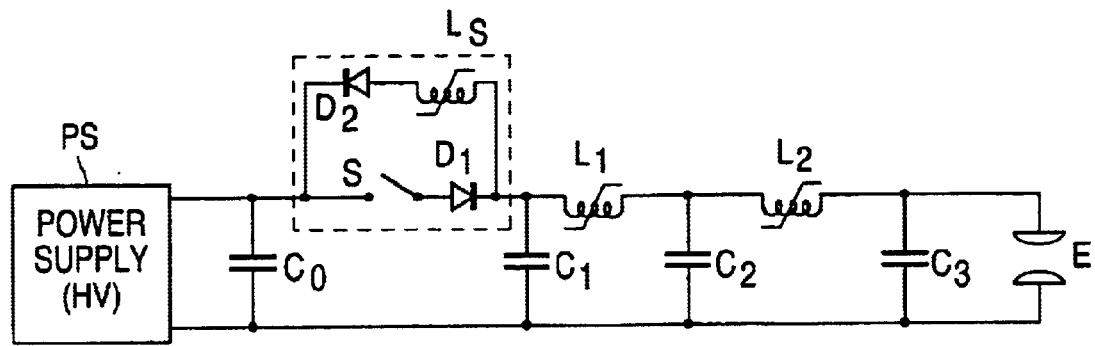
FIG. 1A schematically illustrates a discharge circuit in accordance with a preferred embodiment.

What follows is a cite list of references each of which is, in addition to those references cited above in the priority section, hereby incorporated by reference into the detailed description of the preferred embodiment below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the preferred embodiment with the same effect as just described with respect to the following references:

U.S. Pat. Nos. 6,005,880, 6,020,723, 4,797,888, 4,860,300, 5,427,531, 4,393,505, 4,905,243, 4,977,573, 5,729,562, 5,914,974, 5,936,988, 6,018,537, 5,940,421, 5,754,579, 4,718,072, 4,928,020, 5,142,166, 5,177,754, 5,181,217, 5,305,338, 5,313,481, 5,315,611, 5,319,665, 5,448,580, 6,160,832, 6,212,214, 6,157,662, 6,154,470 and 6,219,368;

U.S. patent application Ser. Nos. 09/317,695, 09/416,344, 09/453,670, 09/390,146, 09/513,025, 60/166,952, 60/173,993, 09/512,417, 09/629,256, 09/715,803, 09/733,874, 09/247,887, 09/447,882, 09/594,892, 09/418,052, 09/452,353, 09/532,276, 09/574,921, 09/692,265, 09/688,561, 09/718,809, 09/771,013, 09/780,124, 09/657,396, 60/204,095, 09/780,120, 60/200,163, 09/584,420, 09/791,430, 09/602,184, 09/599,130, 09/598,552, 09/738,849, 09/734,459, and 09/784,124, which are assigned to the same assignee as the present application;

German patent application No. DE 38 42 492;

PCT applications US 96/01033, US 96/25778;

"Regulation and Drive System for High Rep-Rate Magnetic Pulse Compressors", Birx et al., Proceedings 15th Power Modulator Symposium, pp. 15–21;

"The Use of Saturable Reactors as Discharge Devices for Pulse Generators", Melville, The Proceedings of the Institute of Electrical Engineers, Part III, Vol. 98, 1951, pp. 185–207;

"Thyratrons with Magnetic Switches: The Key to Reliable Excimer Lasers", D. Basting et al., Laser und Optoelektronik, Nr. 2/1984, pp. 128–131;

"Magnetic Switching Circuits for Variable High Voltage Pulse Delays and Gas-Laser Synchronization", Baker et al., J. Phy.E: Sci. Instrum., 19, 1986, pp. 149–152;

I. Smilanski et al., "Electrical Excitation for an XeCl Laser Using Magnetic Pulse Compression", Appl. Phys. Lett. 40(7), 1982 American Institute of Physics, Apr. 1, 1982, pp. 547–548;

O. Kobayashi et al., "High Power Repetitive Excimer Lasers Pumped by an All Solid State Magnetic Exciter", SPIE Vol. 62, High Power and Solid State Lasers, pp. 111–117, 1986;

A. L. Keet et al., "High Voltage Solid-State Pulser for High Repetition-Rate Gas Lasers", EPE Aachen, 1989;

H. M. Von Bergmannm "Thyristor-driven Pulsers for Multikilowatt Average Power lasers", IEEE Proceedings-B, Vol. 139, No.2, pp.123–130, March 1992;

Questek, "Magnetic Pulse Compression for Excimer Lasers", Technical Notes No. 2, May 1983;

T. Shimada et al., "An All Solid-State Magnetic switching Exciter for Pumping Excimer Lasers", Rev. of Sci. Instrum., Col. 56, 1985;

T. Shimada, "Semiconductor switched Magnetic Modulator for Rep-rate Lasers", IEEE Pulse Conference, 1985;

H. J. Baker et al., "An Efficient Laser Pulser Using Ferrite Magnetic Switches", IOP Publishing, pp. 218–224, 1988;

Tatsumi Goto et al., "Design concept and Performance Considerations for Fast High Power Semiconductor Switching for High Repetition Rate and High Power Excimer Laser", 2658 Rev. Sci. Instrum. 68(7), July 1997;

M. Jung et al., PFN's Switched with SCR's at 15 kV, 225 J and 100 Hz Rep-Rate", Proceedings of 22nd International Power Modulator Symposium, Boca Raton, Fla., U.S.A., pp. 173–176 (1996).

DETAILED DESCRIPTION OF THE PREFERRED EMBODIMENTS

FIG. 1A illustrates a discharge circuit in accordance with a preferred embodiment. It is understood that FIG. 1A is only illustrative of features of the present invention, and other components of a discharge circuit for use with an excimer or molecular fluorine laser system are understood by those skilled in the art (see, e.g., U.S. patent application Ser. No. 6,020,723 and the other references cited and incorporated by reference above). Referring to FIG. 1A, a discharge circuit is shown and is provided with a power supply PS which is configured to provide electrical energy to be stored in primary energy storage capacitor $C_0$. The energy stored in the primary storage capacitor $C_0$ is transferred to a pulse compression circuit through a solid state switch which is described in more detail below. The pulse compression circuit includes a series of transfer loops comprised of capacitor-inductor combinations $C_1$-$L_1$-$C_2$ and $C_2$-$L_2$-$C_3$, which, as stages of pulse compression, are configured to increase the peak pulse intensity and reduce the pulse duration preferably to around 100 ns for application at laser electrodes E. In one embodiment, inductors $L_1$ and $L_2$ of the two pulse compression stages are saturable inductors.

Referring back to FIG. 1A, the solid state switch S preferably comprises multiple solid state devices, and is configured to switch voltages at least up to the voltage needed to be applied tat the first pulse compressor stage (i.e., at $C_1$-$L_1$-$C_2$ transfer loop). In one embodiment, the solid state switch S may be configured to switch voltages of 14–43 kV or more. In this manner, a step-up transformer is not used since the solid state switch S can be configured to switch the voltage required to produce the desired output energy of the laser without the use of a transformer. Moreover, the solid state switch S in one aspect of the present invention may be optically or electrically triggered.

The solid state devices forming the solid state switch are preferably IGBTs. These solid state devices are advantageous for high repetition rate performance of an excimer or molecular fluorine laser system because they can be turned off and on quickly. Repetition rates in excess of 1–2 kHz may be achieved using this advantageous switch. Each individual IGBT is capable of switching between 4–8 kV, and typically can switch a maximum voltage of around 4.5 kV. It is desired to switch higher voltages, such as between 15 and 25 kV. Therefore, a solid state switch S according to a preferred embodiment includes more than one IGBT device. For example, four to six IGBTs may be connected in series so that the switch S is capable of switching voltages between up to 18–27 kV. Additional IGBTs may be connected in series such that the system is capable of switching still higher voltages. A maximum limit on the number of IGBTs that may be connected in the series configuration would be reached if it were not possible to spread the voltage across the individual IGBTs at some point, but the practical limit on the number preferred would be based on how much voltage would be switched and how many IGBTs are needed to switch that amount and allowing some excess capability to insure the integrity of the devices over long operating periods without service.

Two or more series combinations of the IGBT devices may be configured in parallel, as well. By doing so, each parallel combination would provide current to the pulse compression circuit according to the voltage applied. Then, the voltage applied over the parallel combinations may be reduced compared to having a switch S with only a single series grouping of IGBTs. The number of IGBTs connected in series in each parallel combination could also be reduced. A combination of series and parallel connections of IGBTs may be used.

The solid state switch S is shown configured with protective electrical components for protecting the switch S from negative currents that may otherwise flow back through the switch S and damage it. In the embodiment of FIG. 1A, a forwardly-directed diode D is connected in series with the switch S and connected after the switch S between the first pulse compression stage capacitor $C_1$ and the switch S. A second diode $D_2$ is series with a saturable inductor $L_S$ is also shown in FIG. 1A optionally coupled in parallel to the solid state switch S to route any negative current sround the switch S. A saturable inductor may be connected in series with the switch S and a diode-inductor series combination may be connected in series with the switch S. A circuit may be connected into the discharge circuit for reversing the polarity of the negative current so that the energy of the negative current is recovered onto the main storage capacitor $C_0$, rather than taking energy away from the capacitor $C_0$.

Figure 1B:
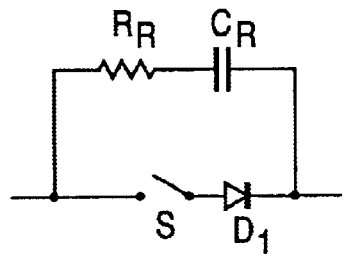
FIG. 1B schematically illustrates an illustrative protective circuit for the switch alternative to that shown at FIG. 1A.
Figure 1C:
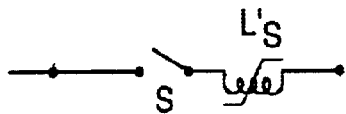
FIG. 1C schematically illustrates another illustrative protective circuit for the switch alternative to those shown at FIGS. 1A and 1B.

Refering now to FIG. 1B, an alternative protective circuit for the switch is shown. The alternative circuit includes a series combination of a capacitor $C_R$ and a resistor $R_R$ coupled in parallel to the solid state switch S-forward diode $D_1$ combination for protecting the solid state switch S from the negative currents that may return from the pulse compression circuit. Referring to FIG. 1C, a saturable inductor $L_S'$ may be connected in series with the switch to protect the switch. Additionally, the protective circuitry shown in FIGS. 1A–1C may be modified as understood by those skilled in the art for protecting the switch, and protective circuits may be included in any of the additional embodiments of discharge circuits described hereinbelow with reference to FIGS. 2A–5B.

Figure 2A:
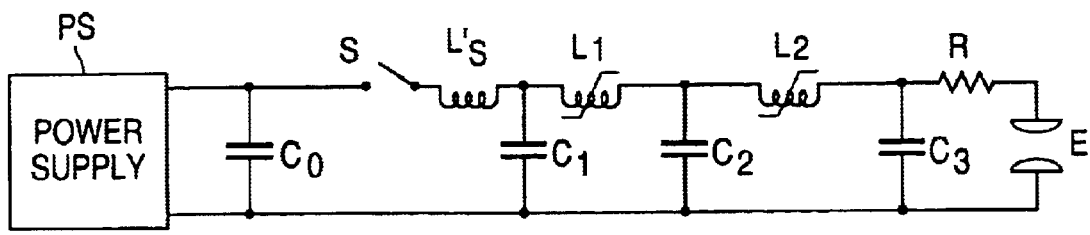
FIG. 2A schematically illustrates a discharge circuit in accordance with a variation of the preferred embodiment shown at FIG. 1A.

FIG. 2A schematically illustrates a discharge circuit in accordance with a variation of the circuit shown in FIG. 1A.

The discharge circuit shown in FIG. 2A is similar to that shown at FIG. 1A, except that a saturable inductor $L_S'$ is connected in series with the switch S before the first stage pulse compression capacitor. In addition, In the manner described above, in accordance with one aspect of the present invention, an additional load such as resistors or a resisitor array may be implemented into the electrical circuitry of the gas discharge. In addition, an additional load R is shown coupled in sereis with the main electrodes E and which may also include a variable or saturable inductor or other dissipative electrical component known to those skilled in the art. The additional load R may be coupled in parallel to the peaking capacitance, and may be partly coupled in series and partly coupled in parallel with the peaking capacitance. The value of the resistor may be comparable to the active impedance of the gas discharge during the main phase of the dissipation of the energy in the gas discharge. Furthermore, the resistance value may be comparable to the wave impedance of the gas discharge electrical loop, and in particular, may be less or greater than the wave impedance. The additional load R is coupled into the discharge circuit as shown for dissipating electrically energy between the main load and the capacitance $C_3$ to facilitate termination of electrical discharges between the electrodes E and in turn suppress the formation or influence of streamers. Further details of this feature of the circuit shown at FIG. 2A are described in U.S. patent application Ser. No. 09/640,595, which is assigned to the same assignee as the present application and is hereby incorporated by reference.

The discharge circuit of FIG. 1A and/or FIG. 2A may also include a magnetic isolator (not shown, but see U.S. Pat. No. 6,020,723, incorporated by reference above) coupled between the primary energy storage capacitor $C_0$ and capacitor $C_1$. The magnetic isolator in one embodiment may be configured to use a toroidal magnetic core with a primary winding in series with the power supply PS, and a secondary winding which is switched by an IGBT semiconductor switching element, and further, an additional single turn bias winding may be provided in series with dc reset circuitry.

The discharge circuit of FIG. 1A or FIG. 2A may also include a snubber circuit (not shown) coupled after the solid state switch S, in parallel to the primary energy storage capacitor $C_0$ the power supply PS. The snubber circuit may include a resistor connected in series with a diode for absorbing reflected energy resulting from imperfect impedance matching between the stages of the pulse compression circuit or between the pulse compression circuit and the gas discharge gap between the discharge electrodes E which may otherwise result in voltage reversal at the capacitor $C_3$ propagated in the reverse direction to reverse the polarity on the capacitors $C_2$ and $C_1$ as well as on the primary energy storage capacitor $C_0$.

Figure 2B:
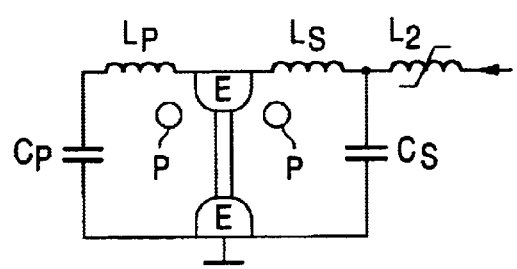
FIG. 2B schematically illustrates a portion of a discharge circuit of an excimer or molecular fluorine laser according to another variation of the preferred embodiment shown at FIG. 1A.
Figure 2C:
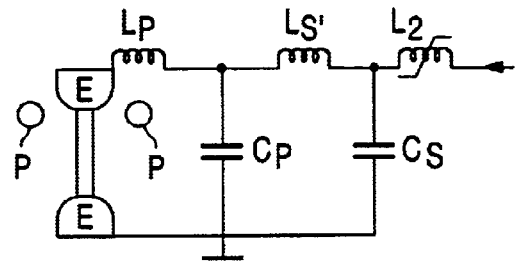
FIG. 2C schematically illustrates a portion of a discharge circuit of an excimer or molecular fluorine laser according to a variation of the embodiment shown at FIG. 2B.

Referring now to FIGS. 2B and 2C, a portion of the discharge circuit of FIGS. 1A and 2A is shown schematically in accord with a pair of variations of the preferred embodiment. A pair of main discharge electrodes E are shown separated by a discharge volume. A pair of preionizers P are also shown, and alternatively only a single preionizer unit P may be used.

The final stage capacitors corresponding to the capacitors $C_3$ of FIGS. 1A and 2A of the pulse compression unit of the pulser module are shown as peaking capacitors $C_P$ and sustaining capacitors $C_S$. The peaking capacitors $C_P$ are connected to the high voltage electrode E through an inductance Lp. The sustaining capacitors $C_S$ are connected to the same high voltage electrode E though inductances Ls. The inductances $L_S$ are greater than the inductances Lp. The peaking capacitors $C_P$ of FIG. 2B are connected on the opposite side of the main electrode E as the sustaining capacitors $C_S$ in the embodiment shown.

The final stage capacitors $C_P$ and $C_S$ of the pulse compression circuit portion shown at FIG. 2C are arranged somewhat differently than those of FIG. 2B. The peaking capacitors $C_P$ are connected to the main electrode E through an inductance Lp, which may be the same or different than the inductance Lp through which the peaking capacitors $C_P$ of the embodiment of FIG. 2B are connected to the main electrode E. The sustaining capacitors $C_S$ of FIG. 2C are connected to the main electrode E through the inductance Lp and an additional inductance $L_S'$. The total inductance through which the sustaining capacitors $C_S$ are connected to the main electrode E is thus Lp+Ls', which may be the same or different than the inductance Ls through which the sustaining capacitors $C_S$ of the embodiment of FIG. 2B are connected to the main electrode E. The inductance Lp+Ls' is clearly greater than the inductance Lp in this embodiment.

The final stage capacitors of these variations of the preferred embodiment of FIGS. 2B and 2C differ from the final stage capacitors $C_3$ shown at FIGS. 1A and 2A. The capacitors $C_3$ of FIGS. 1A and 2A are shown connected to the main electrode E through a same inductance Lp which is typically made to be as small as practical. In contrast, some of the final stage capacitors, i.e., the peaking capacitors $C_P$, of the embodiments of FIGS. 2AAB and 2C are connected to the main electrode E through a first inductance Lp, which is preferably as small as practical, while others of the final stage capacitors, i.e., the sustaining capacitors $C_S$, of FIGS. 2B and 2C are connected to the main electrode E through a different, larger inductance Ls or Lp+Ls'.

The additional inductance $L_S'$ (FIG. 2C) or $L_S$–$L_P$ (FIG. 2B) between the sustaining capacitors $C_S$ and the electrode E, compared with that between the peaking capacitors $C_P$ and the electrode E may be achieved by connecting the sustaining capacitors an enlarged distance from the electrode E The inductances Ls (or Lp+Ls') may be about 60% larger than the inductances Lp. Another amount of inductance may be selected in accordance with a desired spectral purity and gain considerations such as 25% or 50% or more.

Moreover, one skilled in the art would understand that the additional inductances Ls–Lp or Ls' could be added in other ways such as by inserting an inductive element such as a saturable core between the sustaining capacitors $C_S$ and the electrode E. One skilled in the art would also understand that there are other ways to stretch the electrical pulse to achieve the desired reduction in ASE and enhancement of the spectral purity. Another method for stretching a second portion of the electrical pulse while allowing the first portion to reach the electrodes before the second portion may be used in accord with the present invention, for resulting in a temporally stretched electrical pulse applied to a pair of discharge electrodes. For example, a digital delay line may be used, or the electrical pulse may be divided earlier in the pulse compression circuitry or even at the main storage capacitor (see, e.g., the U.S. Pat. No. 6,005,880 patent, wherein a single pair of discharge electrodes is used and the delays introduced according to the '880 patent would be reduced in accord with this present embodiment such that a single electrical pulse is temporally stretched, rather than there being two distinct pulses discharged to two pairs of electrodes as set forth in the '880 patent; and see the U.S. Pat. No. 5,247,531 patent, wherein the two pulses divided for application to preionization and main electrodes may be differently delayed, such as delaying only one of the divided portions of the pulse, and joined at the same main electrodes for stretching the pulse in accord with the present embodiment).

Figure 3:
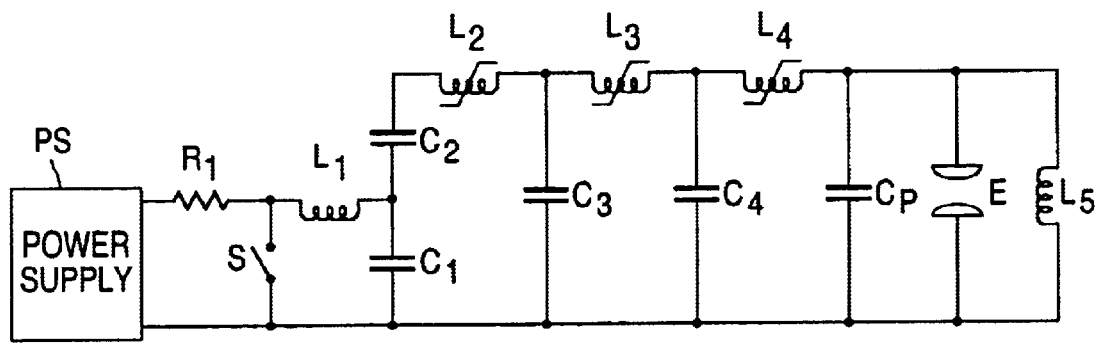
FIG. 3 schematically illustrates a discharge circuit including a voltage doubling circuit in accordance with another variation of the preferred embodiment shown at FIG. 1A.

FIG. 3 schematically illustrates a discharge circuit in accordance with a second preferred embodiment herein. Referring to FIG. 3, the discharge circuit includes a voltage doubling circuit including capacitors $C_1$ and $C_2$ connected as shown with respect to a high voltage source such as a capacitor (not specifically shown but preferably included in the power supply) charged by a power supply. Further, a solid state switch S is provided and coupled at one end to a low potential plate of a capacitor $C_1$ while the other end of the switch S is coupled between the second plate of the capacitor $C_1$ and one of the plates of a second capacitor C2 otherwise connected in series with the first capacitor C1. The other plate of the second capacitor C2 is connected to a pulse compressor circuit which ultimately feeds a compressed current pulse to be applied to the discharge electrodes E.

A diode (not shown) may be connected in parallel to the switch S. In addition, the inductor $L_1$ may or may not be a saturable inductor depending on the selected configuration and/or properties of the switch S.

The pulse compressor includes one or more stages, including saturable inductors L3, L4 and a stage capacitors C3, C4, wherein two such stages are shown in FIG. 3. The switch S is connected such that when it is in a closed position, a current flows as a result of a potential difference between the high voltage source and a low potential capacitor plate of capacitor C1. The flowing current discharges resonantly the capacitor C1 and reverses the polarity of its starting voltage such that twice the voltage is available across the series circuit C1/C2 due to the coupling of the two capacitors C1, C2 as compared to the voltage applied across the solid state switch S. In turn, the total voltage available due to the combination of the capacitors C1 and C2 permits a sufficient current pulse to flow to the discharge electrodes E such that light pulses are emitted from the laser at the desired pulse energy levels irrespective of whether the solid state switch can handle more than, e.g., 60% of such voltages.

In this manner, the solid state switch S may be configured to be capable of handling only slightly more than half the voltage applied at the pulse compressor due to the existence of the voltage doubling circuit, and particularly the combination of capacitors C1 and C2. No step-up transformer is used in this configuration of the discharge circuit having a solid state switch S to obtain the desired pulse energies even though the solid state switch S used may not be capable of handling the total voltage applied at the pulse compressor to produce the desired pulse energies.

Referring back to the example used above with respect to the description of the discharge circuit schematically illustrated at FIG. 1A, the solid state devices forming the solid state switch are again preferably IGBTs. As mentioned, repetition rates in excess of 1–2 kHz may be achieved using this advantageous switch. Each individual IGBT is typically capable of switching between 4–8 kV, and may be configured to switch a maximum voltage of around 4.5 kV. It is desired to switch higher voltages, such as between 15 and 25 kV. Therefore, the solid state switch S used in the discharge circuit of FIG. 3 is preferably includes more than one IGBT device. In constrast to the switch S of FIG. 1A, though, it is only desired that the switch S of FIG. 3 be configured to switch slightly more than half of the voltage to be applied at the electrodes for producing output laser pulses at desired energies due to the presence of the voltage doubling circuit.

For example, three or four IGBTs may be connected in series so that the switch S is capable of switching voltages between up to 13–18 kV. The circuit would then be capable of applying the desired 15–25 kV.

Two or more IGBTs may also be configured in parallel, so that twice or more current will pass the switch S at a given voltage than would pass a single IGBT or series IGBT connection at the same voltage. In this case, less voltage would be applied to each parallel combination, and fewer IGBTs could be connected in series in each parallel combination to achieve desired electrical pulses while the solid state devices would be capable of handling the voltages.

Figure 4:
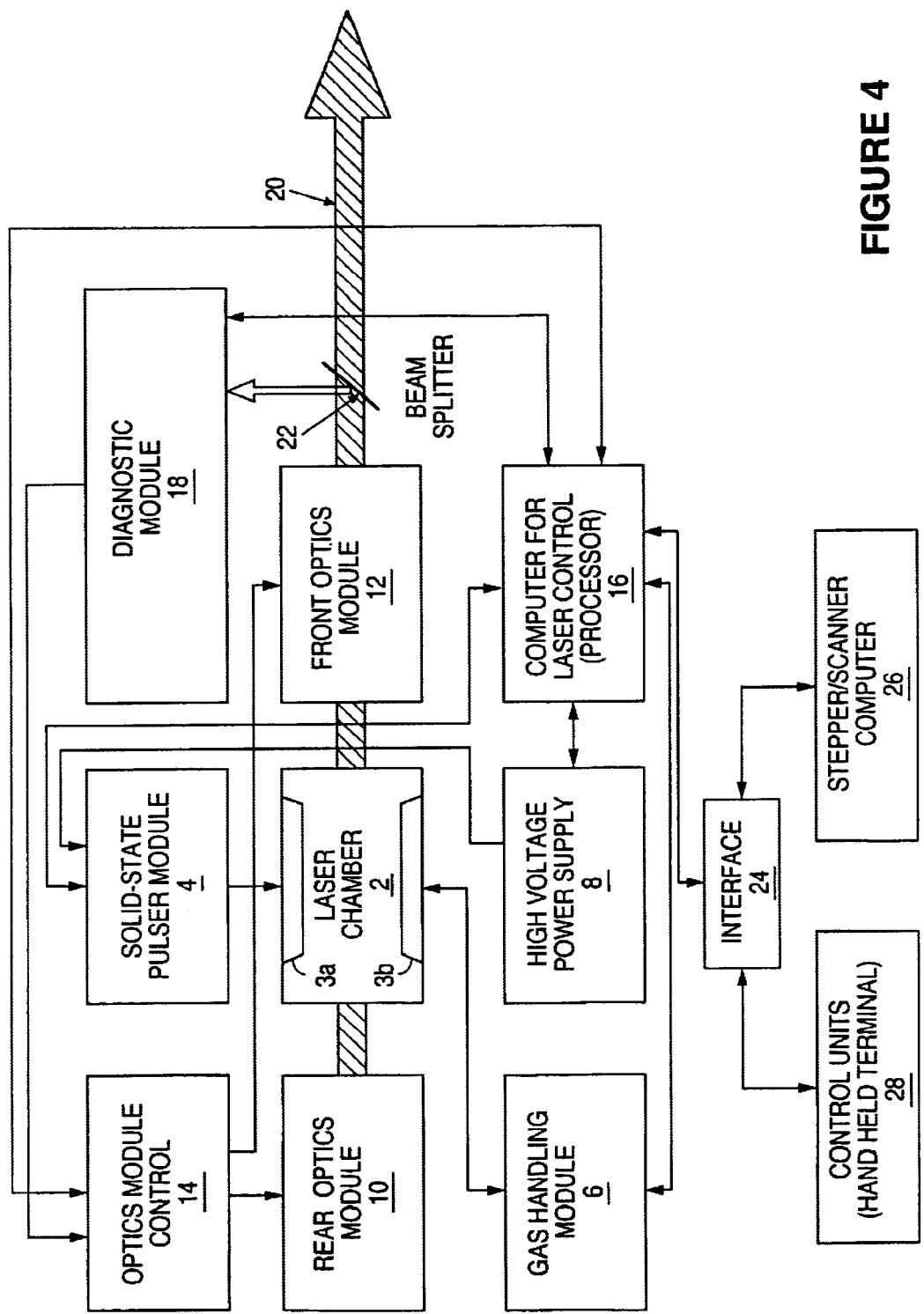
FIG. 4 schematically illustrates an excimer or molecular fluorine laser system including a discharge circuit according to a preferred embodiment.

Referring now to FIG. 4, a DUV or VUV laser system, preferably an excimer, such as ArF, XeCl, XeF, KrCl or KrF, or molecular fluorine (F2) laser system for TFT annealing, deep ultraviolet (DUV) or vacuum ultraviolet (VUV) lithography, or other industrial applications using high voltages, e.g., more than 10 kV, applied to gas discharge electrodes of the laser. Alternative configurations for laser systems for use in such other industrial applications as micromachining, e.g., are understood by one skilled in the art as being similar to and/or modified from the system shown in FIG. 4 to meet the requirements of that application. For this purpose, alternative DUV or VUV laser system and component configurations are described at U.S. patent application Ser. Nos. 09/317,695, 09/130,277, 09/244,554, 09/452,353, 09/512,417, 09/599,130, 09/694,246, 09/712,877, 09/574,921, 09/738,849, 09/718,809, 09/629,256, 09/712,367, 09/769,019, 09/715,803, 09/738,849, 60/202,564, 60/204,095, 60/172,674, 09/574,921, 09/771,013, 09/791,430, 09/733,874 and 09/780,124, and U.S. Pat. Nos. 6,005,880, 6,157,662, 6,154,470, 6,219,368, 6,061,382, 6,020,723, 5,946,337, 6,014,206, 5,559,816, 4,611,270, 5,761,236, each of which is assigned to the same assignee as the present application and is hereby incorporated by reference.

The system shown in FIG. 4 generally includes a laser chamber 2 having a pair of main discharge electrodes 3 corresponding to the electrodes E of FIGS. 1A–3. The electrodes are connected with a discharge circuit 4 including the solid-state switch S and pulser module, and a gas handling module 6. The solid-state pulser module 4 is powered by a high voltage power supply 8. The laser chamber 2 is surrounded by optics module 10 and optics module 12, forming a resonator. The optics modules 10 and 12 are controlled by an optics control module 14, or may be alternatively directly controlled by a computer 16.

The computer 16 for laser control receives various inputs and controls various operating parameters of the system. A diagnostic module 18 receives and measures one or more parameters of a split off portion of the main beam 20 via optics for deflecting a small portion of the beam toward the module 18, such as preferably a beam splitter module 22, as shown. The beam 20 is preferably the laser output to a workpiece or an imaging system (not shown) and ultimately to a workpiece (also not shown), and may be otherwise output to an application process. When used in a lithography laser system, the laser control computer 16 communicates through an interface 24 with a stepper/scanner computer 26 and other control units 28. Other interface equipment may be used for other industrial processes, or the laser system may be completely self-controlled.

The laser chamber 2 contains a laser gas mixture and includes one or more preionization electrodes (not shown) in addition to the pair of main discharge electrodes 3. Preferred main electrodes 3 are described at U.S. patent applications Ser. No. 09/453,670, each of which is assigned to the same assignee as the present application and is hereby incorporated by reference. Other electrode configurations are set forth at U.S. Pat. Nos. 5,729,565 and 4,860,300, each of which is assigned to the same assignee, and alternative embodiments are set forth at U.S. Pat. Nos. 4,691,322, 5,535,233 and 5,557,629, all of which are hereby incorporated by reference. Preferred preionization units are set forth at U.S. patent applications Ser Nos. 09/692,265, 09/532,276 and 09/247,887, each of which is assigned to the same assignee as the present application, and alternative embodiments are set forth at U.S. Pat. Nos. 5,337,330, 5,818,865 and 5,991,324, all of the above patents and patent applications being hereby incorporated by reference.

The solid-state pulser module 4 and high voltage power supply 8 supply electrical energy in compressed electrical pulses to the preionization and main electrodes 3 within the laser chamber 2 to energize the gas mixture. Components of the preferred pulser module and high voltage power supply have been described above with reference to FIGS. 1A–3, and variations may be understood based on the description at any of U.S. patent applications Ser. Nos. 09/640,595, 60/198,058, 60/204,095, 09/432,348 and 60/204,095, and U.S. Pat. Nos. 6,005,880, 6,198,761 and 6,020,723, each of which is assigned to the same assignee as the present application and which is hereby incorporated by reference into the present application. Other alternative pulser modules including variations on preferred embodiments herein may be described at U.S. Pat. Nos. 5,982,800, 5,982,795, 5,940,421, 5,914,974, 5,949,806, 5,936,988, 6,028,872 and 5,729,562, each of which is hereby incorporated by reference. A conventional pulser module may generate electrical pulses in excess of 1 Joule of electrical power (see the '988 patent, mentioned above). Other features and aspects of the preferred pulser module are set forth above and below, with reference to FIGS. 1A–3 and 5A–5B.

The laser resonator includes optics module 10 including line-narrowing optics for a line narrowed excimer or molecular fluorine laser, which may be replaced by a high reflectivity mirror or the like in a laser system wherein either line-narrowing is not desired, or if line narrowing is performed at the front optics module 12, or a spectral filter external to the resonator is used, or if the line-narrowing optics are disposed in front of the HR mirror, for narrowing the linewidth of the output beam.

The laser chamber 2 is sealed by windows transparent to the wavelengths of the emitted laser radiation 14. The windows may be aligned to at least partially polarize the beam such as orienting the windows at Brewster's angle to the beam, or the windows may be aligned at another angle, e.g., 5°, to the optical path of the resonating beam. One of the windows may also serve to output couple the beam (see the application Ser. No. 60/212,183), or one of the windows may serve as a highly reflective resonator reflector such as when line-narrowing and/or selection optics are included in the front optics module 12 (see the Ser. No. 09/718,809 application), and one of the windows may participate in line-narrowing and/or line selection (see the application Ser. No. 09/317,695).

After a portion of the output beam 20 passes the outcoupler of the optics module 12, that output portion impinges upon beam splitter module 22 which includes optics for deflecting a portion of the beam to the diagnostic module 18, or otherwise allowing a small portion of the outcoupled beam to reach the diagnostic module 18, while a main beam portion 20 is allowed to continue as the output beam 20 of the laser system. Preferred optics include a beamsplitter or otherwise partially reflecting surface optic. The optics may also include a mirror or beam splitter as a second reflecting optic. More than one beam splitter and/or HR mirror(s), and/or dichroic mirror(s) may be used to direct portions of the beam to components of the diagnostic module 18. A holographic beam sampler, transmission grating, partially transmissive reflection diffraction grating, grism, prism or other refractive, dispersive and/or transmissive optic or optics may also be used to separate a small beam portion from the main beam 20 for detection at the diagnostic module 18, while allowing most of the main beam 20 to reach an application process directly or via an imaging system or otherwise.

The output beam 20 may be transmitted at the beam splitter module 21 while a reflected beam portion is directed at the diagnostic module 18, or the main beam 20 may be reflected, while a small portion is transmitted to the diagnostic module 18. The portion of the outcoupled beam which continues past the beam splitter module 21 is the output beam 20 of the laser, which propagates toward an industrial or experimental application such as a workpiece for TFT annealing or an imaging system and workpiece for photolithographic applications. Variations of beam splitter modules particularly for an excimer or molecular fluorine laser system are set forth at U.S. patent application Ser. Nos. 09/598,552, 09/712,877, 09/780,124 and 09/718,809, which are each assigned to the same assignee and are hereby incorporated by reference.

In addition, and particularly for the molecular fluorine laser system, and also for the ArF laser system, an enclosure (not shown) may seal the beam path of the beam 20 outcoupled from the laser such as to keep the beam path free of photoabsorbing species until the beam 20 reaches the workpiece, or imaging system enclosure or other enclosure. Smaller enclosures may seal the beam path between the chamber 2 and the optics modules 10 and 12 and between the beam splitter 22 and the diagnostic module, and the optics modules are preferably enclosed and either evacuated or purged with an inert gas. The preferred enclosure is described in detail in the U.S. Pat. No. 6,219,368 patent and in the application Ser. Nos. 09/598,552, 09/594,892, and 09/131,580, each of which is assigned to the same assignee and is hereby incorporated by reference, and U.S. Pat. Nos. 5,559,584, 5,221,823, 5,763,855, 5,811,753 and 4,616,908, all of which are hereby incorporated by reference.

The diagnostic module 18 preferably includes at least one energy detector. This detector measures the total energy of the beam portion that corresponds directly to the energy of the output beam 20 (see U.S. Pat. Nos. 4,611,270 and 6,212,214, which are hereby incorporated by reference. An optical configuration such as an optical attenuator, e.g., a plate or a coating, or other optics may be formed on or near the detector or beam splitter module 21 to control the intensity, spectral distribution and/or other parameters of the radiation impinging upon the detector (see U.S. patent application Ser. Nos. 09/172,805, 09/741,465, 09/712,877 and 09/774,238, which are assigned to the same assignee as the present application and are hereby incorporated by reference).

One other component of the diagnostic module 18 is preferably a wavelength and/or bandwidth detection component such as a monitor etalon or grating spectrometer (see U.S. Pat. Nos. 6,160,832 and 6,160,831, and U.S. patent application Ser. Nos. 09/416,344, 09/791,496, 09/686,483, and 09/791,431, each of which is assigned to the same assignee as the present application, and further U.S. Pat. Nos. 4,905,243, 5,978,391, 5,450,207, 4,926,428, 5,748, 346, 5,025,445, and 5,978,394, all of the above wavelength and/or bandwidth detection and monitoring component references being hereby incorporated by reference.

Other components of the diagnostic module may include a pulse shape detector or ASE detector, such as are described at U.S. patent application Ser. Nos. 09/484,818 and 09/418,052, respectively, each of which is assigned to the same assignee as the present application and is hereby incorporated by reference, such as for gas control and/or output beam energy stabilization, or to monitor the amount of amplified spontaneous emission (ASE) within the beam to ensure that the ASE remains below a predetermined level. There may be a beam alignment monitor, e.g., such as is described at U.S. Pat. No. 6,014,206 which is assigned to the same assignee and is hereby incorporated by reference.

The processor or control computer 16 receives and processes values of some of the pulse shape, energy, ASE, energy stability, energy overshoot for burst mode operation, wavelength, spectral purity and/or bandwidth, among other input or output parameters of the laser system and output beam (see the Ser. No. 09/688,561 application). The processor 16 also controls the line narrowing module to tune the wavelength and/or bandwidth or spectral purity, and controls the power supply and pulser module 4 and 8 to control preferably the moving average pulse power or energy, such that the energy dose at points on the workpiece is stabilized around a desired value. In addition, the computer 16 controls the gas handling module 6 which includes gas supply valves connected to various gas sources.

The laser gas mixture is initially filled into the laser chamber 2 during new fills. The gas composition for a very stable excimer or molecular fluorine laser in accord with the preferred embodiment uses helium or neon or a mixture of helium and neon as buffer gas(es), depending on the particular laser being used. Preferred gas compositions are described at U.S. Pat. Nos. 4,393,405, 4,977,573 and 6,157,662 and U.S. patent application Ser. Nos. 09/513,025, 09/447,882, 09/418,052 and 09/688,561, which are assigned to the same assignee and are hereby incorporated by reference into the present application. The concentration of the fluorine in the gas mixture may range from 0.003% to 1.00%, and is preferably around 0.1%. An additional gas additive, such as a rare gas, may be added for increased energy stability and/or as an attenuator as described in the application Ser. No. 09/513,025 incorporated by reference above. Specifically, for the F2-laser, an addition of xenon and/or argon may be used. The concentration of xenon or argon in the mixture may range from 0.0001 % to 0.1 %. For an ArF-laser, an addition of xenon or krypton may be used also having a concentration between 0.0001% to 0.1%. For the KrF laser, an addition of xenon or argon may be used also having a concentration between 0.0001% to 0.1%. Other gas additives that may be used are set forth in the '025 application.

Halogen and rare gas injections, total pressure adjustments and gas replacement procedures are performed using the gas handling module 6 preferably including a vacuum pump, a valve network and one or more gas compartments. The gas handling module 6 receives gas via gas lines connected to gas containers, tanks, canisters and/or bottles. Preferred gas handling and/or replenishment procedures of the preferred embodiment, other than as specifically described herein, are described at U.S. Pat. Nos. 4,977,573, 6,212,214 and 5,396,514 and U.S. patent application Ser. Nos. 09/447,882, 09/418,052, 09/734,459, and 09/688,561, each of which is assigned to the same assignee as the present application, and U.S. Pat. Nos. 5,978,406, 6,014,398 and 6,028,880, all of which are hereby incorporated by reference. A xenon gas supply may be included either internal or external to the laser system according to the '025 application, mentioned above.

A general description of the line-narrowing features of the several embodiments of the present is provided here, followed by a listing of patent and patent applications being incorporated by reference as describing variations and features that may used within the scope of the present invention for providing an output beam with a high spectral purity or bandwidth (e.g., below 1 pm, and preferably less than 0.6 pm). Exemplary line-narrowing optics contained in the optics module 10 include one or more of a beam expander, an optional etalon or other interferometric device (see the application Ser. No. 09/715,803), a grism, a birefringence plate or block, a dispersive prism and a diffraction grating, which produces a relatively high degree of dispersion, for a narrow band laser such as is used with a refractive or catadioptric optical lithography imaging system. Such precise line-narrowing specifications may be relaxed for other industrial applications than lithography. As mentioned above, the front optics module may include line-narrowing optics as well. For a semi-narrow band laser such as is used with an all-reflective imaging system, the grating may be replaced with a highly reflective mirror, and a lower degree of dispersion may be produced by a dispersive prism. A semi-narrow band laser would typically have an output beam linewidth in excess of 1 pm and may be as high as 100 pm in some laser systems, depending on the characteristic broadband bandwidth of the laser.

The beam expander of the above exemplary line-narrowing optics of the optics module 10 preferably includes one or more prisms. The beam expander may include other beam expanding optics such as a lens assembly or a converging/diverging lens pair. The grating or a highly reflective mirror is preferably rotatable so that the wavelengths reflected into the acceptance angle of the resonator can be selected or tuned. Alternatively, the grating, or other optic or optics, or the entire line-narrowing module may be pressure tuned, such as is set forth in the application Ser. Nos. 09/771,366 and 60/212,183 and U.S. Pat. No. 6,154,470, each of which is assigned to the same assignee and is hereby incorporated by reference. The grating may be used both for dispersing the beam for achieving narrow bandwidths and also preferably for retroreflecting the beam back toward the laser tube. Alternatively, a highly reflective mirror is positioned after the grating which receives a reflection from the grating and reflects the beam back toward the grating in a Littman configuration, or the grating may be a transmission grating. One or more dispersive prisms may also be used, and more than one etalon or other interferometric device may be used.

Depending on the type and extent of line-narrowing and/or selection and tuning that is desired, and the particular laser that the line-narrowing optics are to be installed into, there are many alternative optical configurations that may be used. For this purpose, those shown in U.S. Pat. Nos. 4,399,540, 4,905,243, 5,226,050, 5,559,816, 5,659,419, 5,663,973, 5,761,236, and 5,946,337, 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370, 5,226,050, 5,559,816, 5,659,419, 5,663,973, 5,761,236 and 4,829,536, and German patent DE 298 22 090.3, and the other U.S. patent, U.S. patent application and non-patent references described herein are each hereby incorporated by reference into the present application.

Optics module 12 preferably includes means for outcoupling the beam 20, such as a partially reflective resonator reflector. The beam 20 may be otherwise outcoupled such as by an intra-resonator beam splitter or partially reflecting surface of another optical element, and the optics module 12 would in this case include a highly reflective mirror. The optics control module 14 preferably controls the optics modules 10 and 12 such as by receiving and interpreting signals from the processor 16, and initiating realignment or reconfiguration procedures.

Figure 5A:
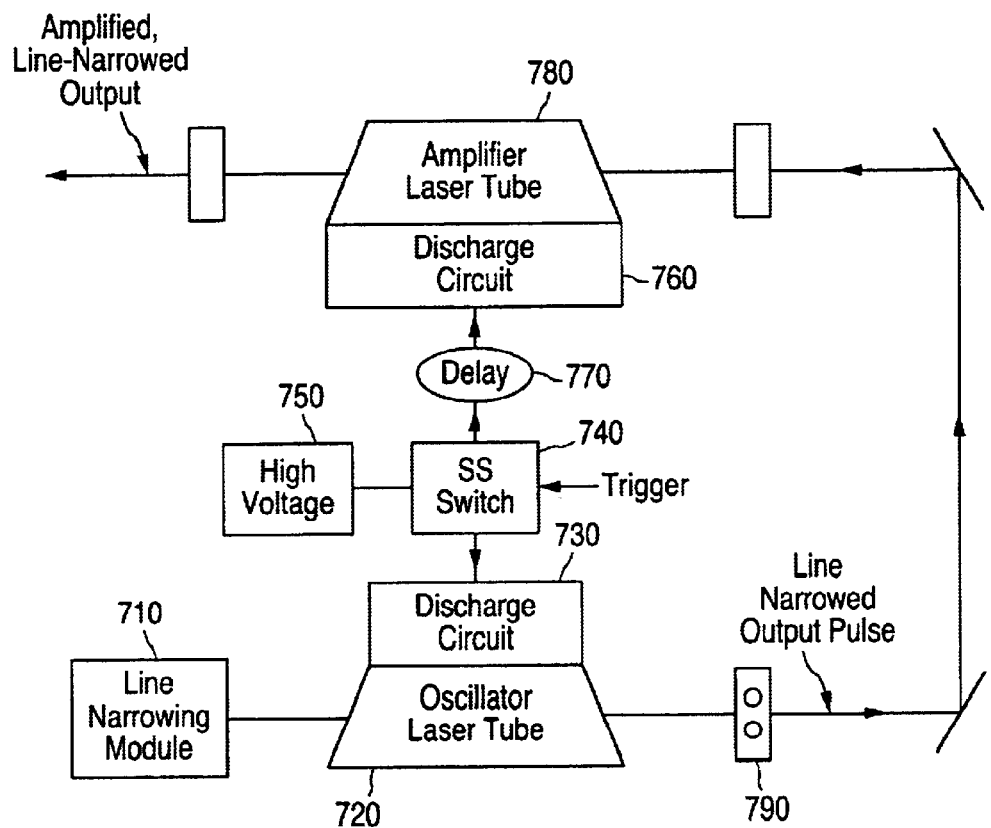
FIG. 5A schematically illustrates an oscillator-amplifier configuration for an excimer or molecular fluorine laser according to an alternative embodiment.

FIG. 5A schematically illustrates an alternate discharge circuit in accordance with a variation of the preferred embodiments set forth herein. Referring to FIG. 5A, the oscillator laser shown includes a resonator having a line-narrowing and/or selection module 710, and oscillator laser tube 720 and an output coupler 790. The oscillator laser may be configured as described above with reference to FIG. 4, other than as described herein for coupling with the amplifier 780.

A discharge circuit 730 is shown and includes a pulse compressor as described above in the various embodiments. The discharge circuit 730 may also include configurations as shown and described in any of U.S. Pat. Nos. 6,020,723, 6,005,880, 5,729,562, 5,914,974, 5,936,988, 5,940,421, and 5,982,800, which are incorporated herein by reference for all purposes. In particular, a pair of main discharge electrodes and one or more preionization electrodes are connected to the discharge circuit 730 and are located within the oscillator laser tube 720.

The discharge circuit 730 of the oscillator is connected to an all solid state switch 740 preferably including preferably multiple IGBTs as described above. When the switch 740 is triggered, a high voltage 750 is applied to the discharge circuit 730, and a line-narrowed output pulse is generated. The linewidth of the line narrowed output pulse may be as small as 1–2 pm and is preferably less than 1 pm, and more preferably less than 0.6 pm when used for microlithography, wherein such narrow bandwidth specifications may be relaxed in other industrial applications.

When the switch 740 is triggered, a discharge circuit 760 of an amplifier laser also has the high voltage 750 applied to it through a delay circuit 770. The delay circuit 770 may use a saturable core such as that set forth in U.S. Pat. No. 6,005,880, which is incorporated herein by reference or a choke or other means for delaying the pulse as understood by those skilled in the art. The discharge circuit 760 of the amplifier laser may be otherwise configured similar to or the same as the discharge circuit 730. The amplifier laser tube 780 may also be configured in a similar manner to or the same as the oscillator laser tube 720. For example, the main and preionization electrodes may be the same and the gas mixture may substantially be the same, and also, connected through a processor and gas supply system as set forth above with respect to the oscillator laser tube.

The high voltage 750 is applied to the discharge circuit 760 shortly after the high voltage 750 is applied to the discharge circuit 720 due to the delay circuit 770 between the solid state switch 740 and the discharge circuit 760. The delay circuit allows the line-narrowed output pulse from the oscillator laser to reach the amplifier laser tube 780 at around the same time as the current pulse is applied to the discharge electrodes of the amplifier laser tube 780. The presence of the line-narrowed output pulse at the amplifier laser tube 780 at the time of the discharge of the amplifier laser allows the line-narrowed output pulse to be amplified by the amplified laser. The result is an amplified, line-narrowed output pulse of the total oscillator-amplifier laser configuration.

Advantageously, the high voltage 750 applied across the solid state switch 740 need not be as high as would be required if only the oscillator laser tube were used to generate the output pulse of the laser system. A lower voltage applied to the discharge circuit 720 results in the amplified, line-narrowed output pulse having the desired energy. The applied voltage at the electrodes would be at least high enough to generate an output pulse, such as 10–15 kV, e.g., depending on other conditions of the tube 720. A transformer may advantageously be left out of the discharge circuit 730 since the solid state switch 740, including the multiple IGBTs connected in series and/or parallel configuration, can handle the voltage, and the output pulse energy is at the desired level.

Figure 5B:
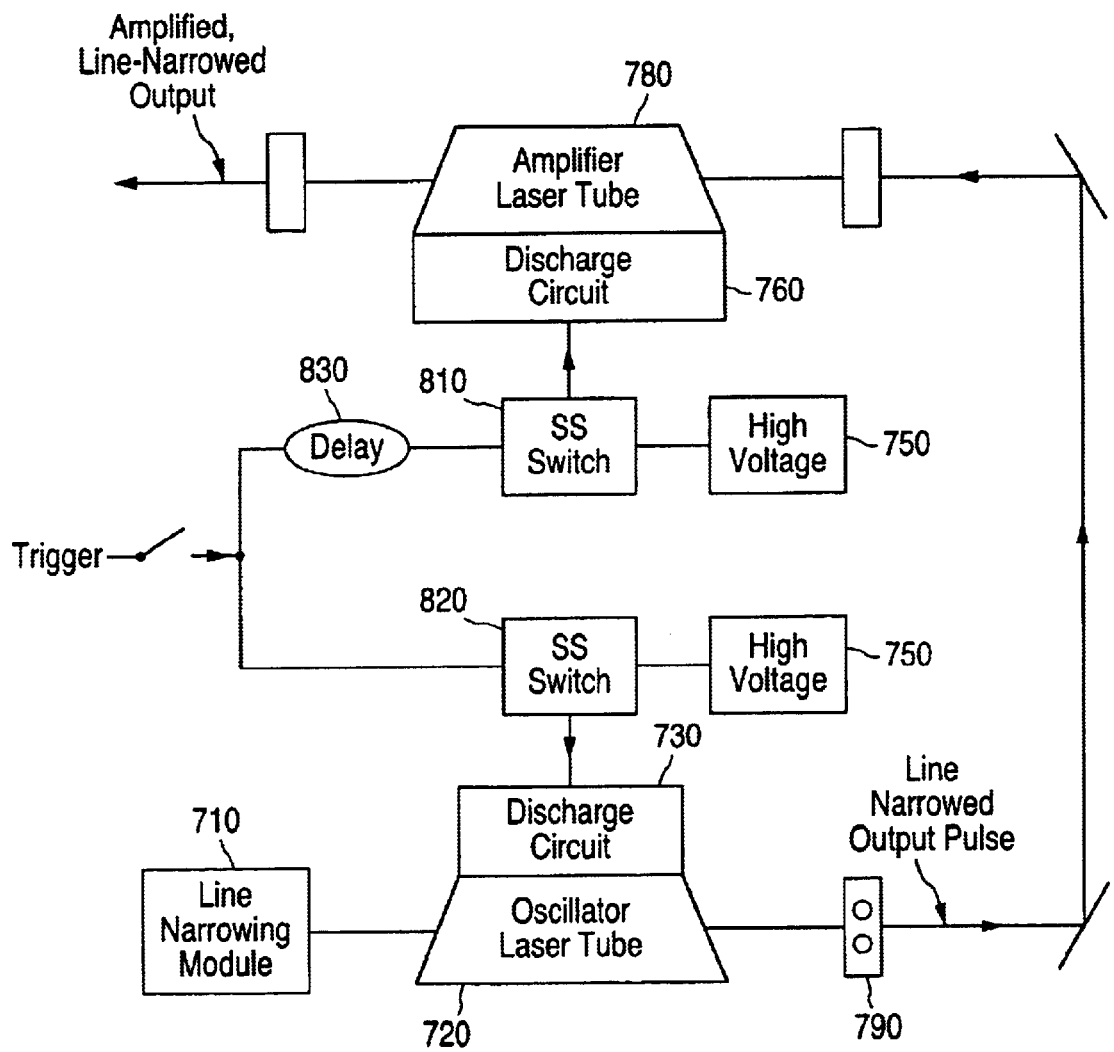
FIG. 5B schematically illustrates a variation of the oscillator-amplifier configuration of FIG. 5A.

FIG. 5B schematically illustrates an alternate discharge circuit arrangement in accordance with a variation of the oscillator-amplifier configuration shown in FIG. 5A. Like parts as that shown in FIG. 5A are so labeled and thus, a discussion of each of which are omitted here. In contrast with the embodiment shown in FIG. 5A, the oscillator-amplifier design shown in FIG. 5B includes two solid state switches 810, 820 which are used instead of the one solid state switch 740 of the embodiment shown in FIG. 5A.

As shown, the trigger pulse is split and a first current path to the switch 820 of the oscillator laser does not include a delay circuit 830, while a second current path to the switch 810 of the amplifier includes a delay circuit 830.

Indeed, the first current path leads to the first solid state switch 820 which permits a high voltage to be applied to the discharge circuit 720 of the oscillator laser. The second current path leads to the second switch 810, but does not trigger the switch 810 until a short time period after the trigger pulse triggers the first switch 820. For example, if the delay circuit 830 includes a saturable core, then the delay circuit 830 would depend on the bias applied across the core and the physical characteristics of the core. Further information on the saturable core and its physical characteristics can be found in U.S. Pat. No. 6,005,880 referenced above. Thus, similar to the configuration shown in FIG. 5A, in the oscillator-amplifier configuration of FIG. 5B, a current pulse is applied to the discharge circuit 760 at the time a line-narrowed pulse from the oscillator laser reaches the amplifier laser tube 780, resulting in amplification of the line-narrowed output pulse.

Figure 6A:
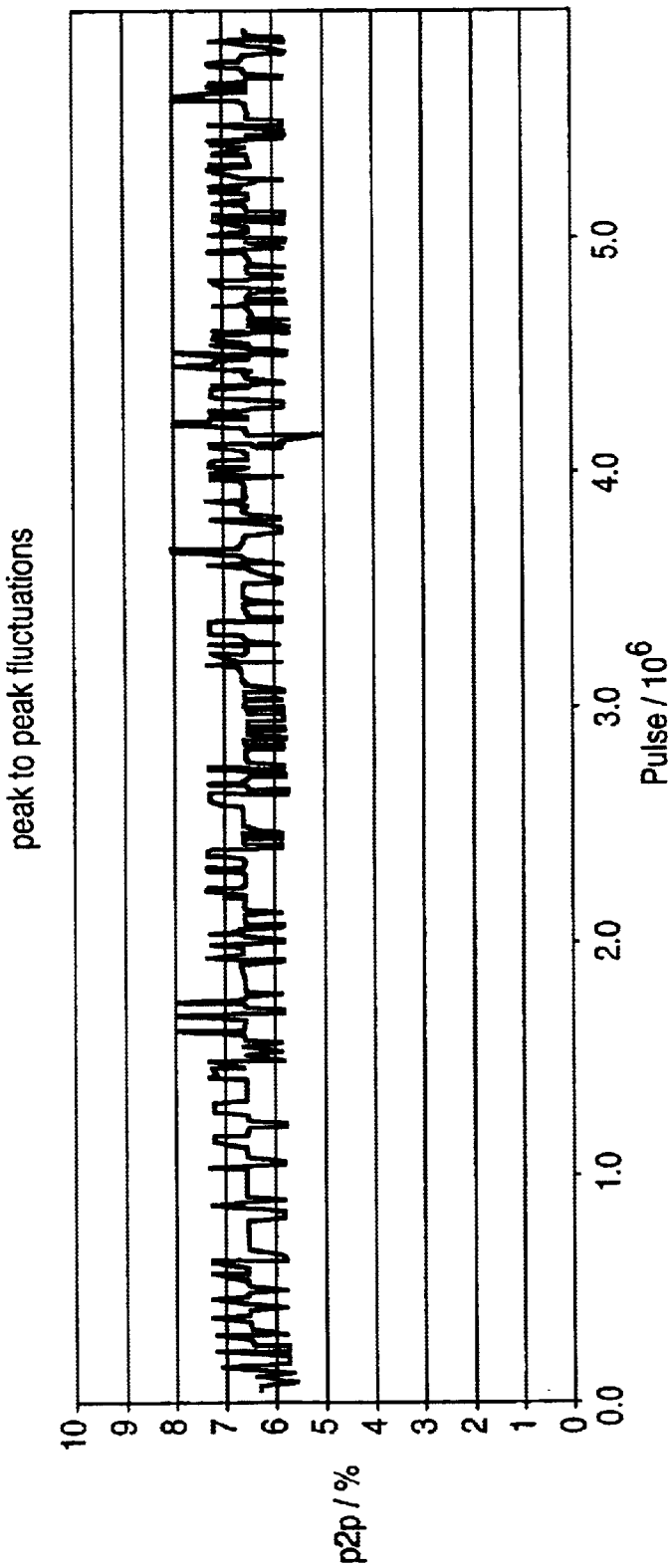
FIG. 6A is a measured plot of peak-to-peak pulse energy fluctuations over several million laser pulses for a laser system according to a preferred embodiment.
Figure 6B:
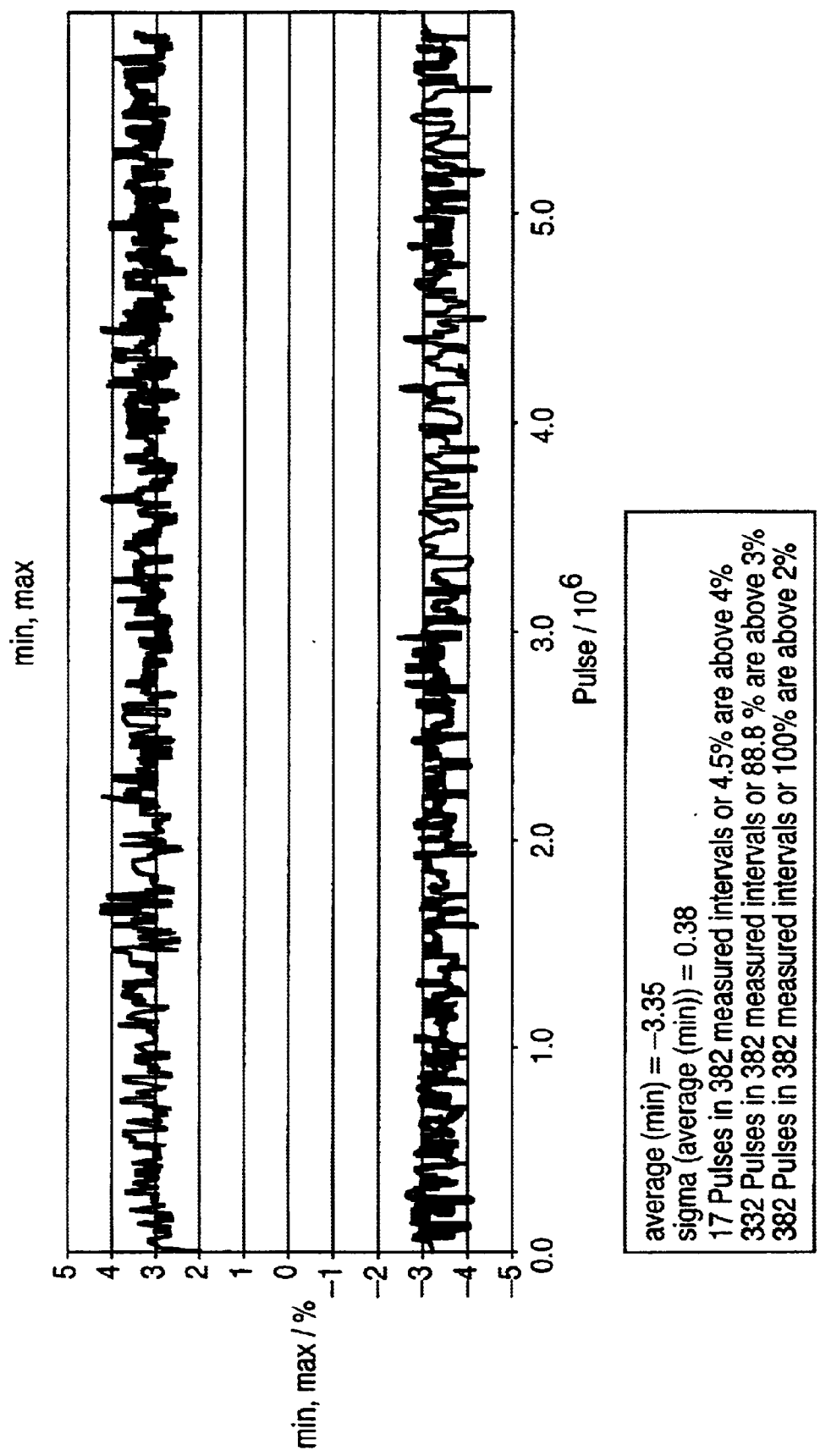
FIG. 6B is a measured plot of the energy stability as energy minima and maxima for a laser system according to a preferred embodiment.
Figure 6C:
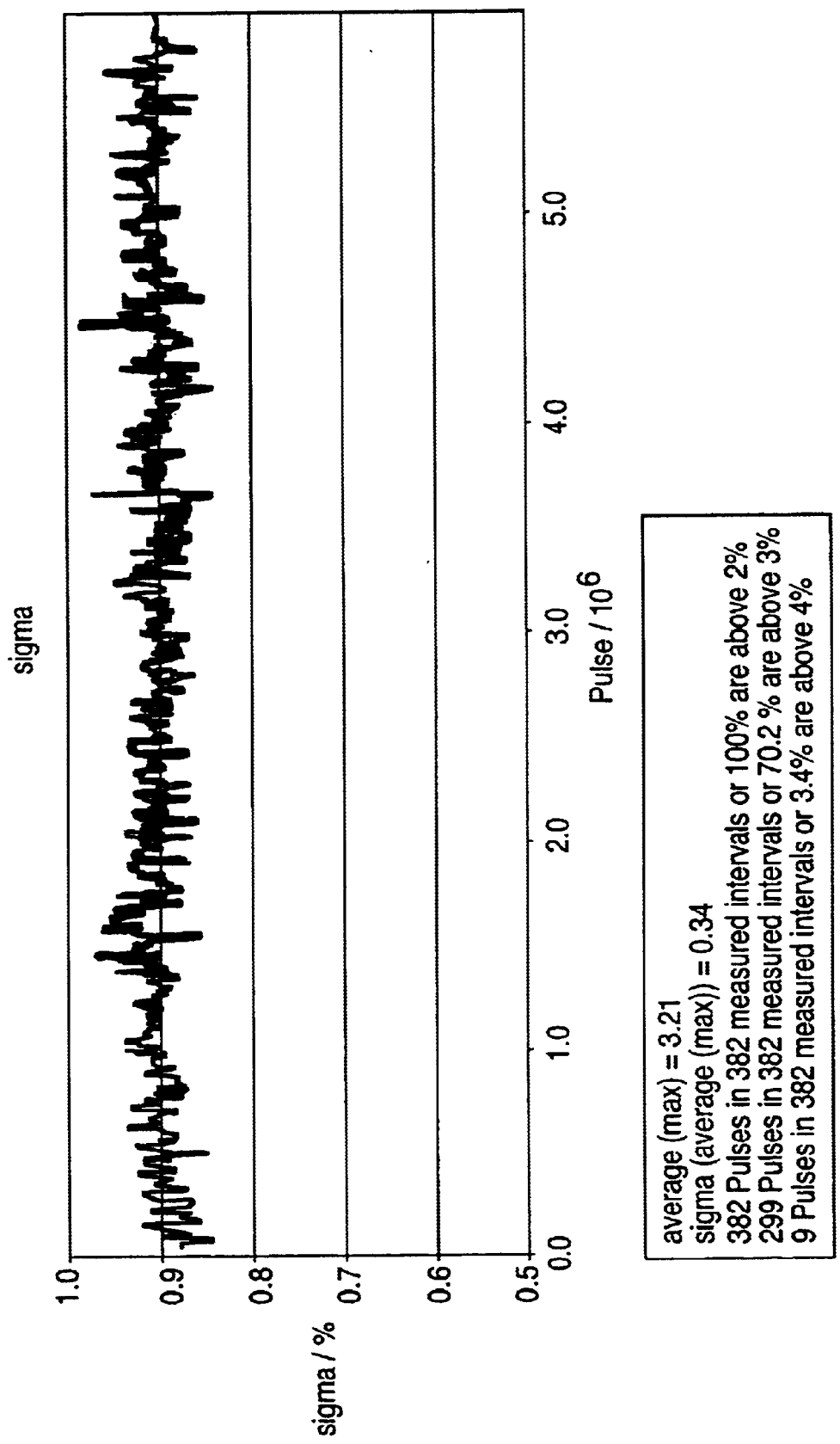
FIG. 6C is a measured plot of the energy stability as a percentage sigma for a laser system according to a preferred embodiment.

FIG. 6A illustrates the energy stability as peak-to-peak fluctuations for a laser system including the discharge circuit, FIG. 6B illustrates the energy stability as energy minima and maxima for a laser system including the discharge circuit, and FIG. 6C illustrates the energy stability as a percentage sigma for a laser system including the discharge circuit. As can be seen from FIG. 6A, the peak to peak fluctuations are between approximately 5% to 8% over approximately six million pulses, while FIG. 6B shows that the energy minima and maxima are 3% to 4% varied from the average pulse energy over six million pulses. Lastly, it can be seen from FIG. 6C that the energy stability is around 0.9% over approximately six million pluses.

In the manner described above, in accordance with the various embodiments of the present invention, an excimer or molecular fluorine laser includes a laser tube filled with a laser gas surrounded by an optical resonator, where the laser tube has multiple electrodes including a pair of main electrodes connected to a discharge circuit for exciting the laser gas to produce a laser output beam. The discharge circuit has an all solid state switch and preferably does not include a transformer. The solid state switch includes a series of solid state devices that may be capable of switching voltages in excess of 12 kV, such as 14–32 kV or more, or the voltage needed generated output laser pulses. The series of switches has a rise time of approximately less than 300 ns, and preferably around 100 ns or less. The switch may be capable of switching voltages of slightly more than half or more, but less than the entire voltage needed to produce output pulses at desired energies. In this case, a voltage doubling circuit may then be provided after the switch to approximately double the voltage applied to the pulse compressor circuit before the pulse reaches the main discharge electrodes. The voltage doubling circuit preferably includes a pair of capacitors each having a plate connected to the output of the switch. A first of the capacitors has its second plate connected to the pulse compressor and the second capacitor has its second plate grounded. The switch may be connected to each of an oscillator laser discharge circuit and an amplifier laser discharge circuit. Alternatively, two synchronized switches may be used in the oscillator-amplifier arrangement.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby. While the discharge circuit has been illustrated and described above in various embodiments, within the scope of the present invention, the discharge circuit may also be modified to include many other variations as set forth in the related art references cited above, or in the additional embodiments discussed below, or in any equivalents thereof, or as would be understood by one skilled in the art, without varying outside of the scope of the embodiments set forth above in conjunction with FIGS. 1A–5B. Moreover, the modifications described above and may be known to one skilled in the art may be made to the embodiments described above within the spirit and scope of those embodiments and the present invention.

As discussed above, in accordance with the embodiments of the present invention, the discharge circuit may be configured to include a solid state switch and not having a step-up transformer, while providing current pulses to the discharge electrodes E of sufficient intensity to produce an output laser pulse for an excimer or molecular fluorine laser at the prescribed pulse energy for TFT annealing, photolithographic processing, or another industrial application. Indeed, one advantage of not having a step-up transformer in the discharge circuitry is that the geometric volume of the pulser circuit and the overall laser system is reduced. Additionally, a further advantage is that the thyratron of conventional circuits not having transformers can be replaced one-to-one with the solid state switch of the embodiments set forth herein. Thus, the circuit does not require further modification beyond the replacement of the solid state switch while maintaining the performance criteria.

What is claimed is:

1. An excimer or molecular fluorine laser, comprising:
a laser tube filled with a laser gas;
an optical resonator;
a discharge circuit; and
a plurality of electrodes within the laser tube connected to said discharge circuit for exciting the laser gas to produce a laser output beam, said discharge circuit including a solid state switch configured to switch a voltage needed to produce desired pulse energies, the switch comprising a plurality of insulated gate bipolar transistors (IGBTs) including a parallel combination and each path of the parallel combination includes a single IGBT.

2. The laser of claim 1 wherein the solid state switch is configured to switch a voltage signal in excess of 12 kV.

3. The laser of claim 2 wherein the solid state switch has a rise time of less than 300 ns.

4. The laser of claim 2 wherein the solid state switch has a rise time of less than 100 ns.

5. The laser of claim 1 further including a protective circuit coupled in parallel to said solid state switch.

6. The laser of claim 5 wherein said protective circuit includes a diode 15 and a saturable inductor.

7. The laser of claim 5 wherein said protective circuit includes a resistor and a capacitor connected in series.

8. The laser of claim 1, said all solid state switch configured to switch said voltage needed to produce said desired pulse energies without having a step-up transformer disposed within the circuit after the switch.

9. The laser of claim 8 wherein said solid state switch includes a series of insulated gate bipolar transistors (IGBT), said discharge circuit not including a step up voltage transformer.

10. The laser of claim 9 wherein said series of IGBTs are configured to switch a voltage signal of approximately 20 kV.

11. The laser of claim 10 wherein the solid state switch has a rise time of less than 100 ns.

12. The laser of claim 8 further including a voltage doubling circuit for doubling the voltage signal applied to the pulse compressor circuit before the pulse reaches the pair of electrodes.

13. The laser of claim 12 wherein said doubling circuit includes a pair of capacitors.

14. The laser of claim 13 wherein said solid state switch includes at least three parallel paths each including a single IGBT.

15. The laser of claim 14 wherein said series of IGBTs are configured to switch a voltage signal of approximately 20 kV.

16. The laser of claim 1, wherein the discharge circuit comprises:
said solid state switch for switching an electrical pulse provided by a main storage capacitor charged by a power supply;
a voltage doubling circuit including a pair of capacitors for doubling the voltage of the pulse switched by the solid state switch; and
a pulse compression circuit for compressing the pulse for application to the electrodes.

17. The laser system of claim 16, wherein the voltage doubled by the voltage doubling circuit is sufficient for the laser system to produce laser pulses of desired energies without a step-up transformer.

18. The laser of claim 1, wherein the discharge circuit comprises:
said solid state switch including said plurality of IGBTs for switching an electrical pulse provided by a main storage capacitor charged by a power supply, said electrical pulse having sufficient energy to produce laser pulses of desired energies without disposing a step-up transformer in the discharge circuit after the switch; and a pulse compression circuit for compressing the pulse for application to the electrodes.

19. The laser of claim 1, wherein said switch further includes a series combination of at least two IGBTs in parallel with said other paths.

20. The laser of claim 1, wherein said switch further includes a series combination of at least three to six IGBTs in parallel with said other paths.

21. An excimer or molecular fluorine laser, comprising:
a laser tube filled with a laser gas;
an optical resonator;
a discharge circuit; and
a plurality of electrodes within the laser tube connected to said discharge circuit for exciting the laser gas to produce a laser output beam, said discharge circuit including a solid state switch configured to switch a voltage needed to produce desired pulse energies,
wherein peaking capacitors from which current pulses are applied to the electrodes are positioned as close as possible to the electrodes, and sustainer capacitors, also from which current pulses are applied to the electrodes, have an enlarged inductance between them and the discharge electrodes for extending the current pulse.

22. An excimer or molecular fluorine laser, comprising:
a laser tube filled with a laser gas;
an optical resonator;
a discharge circuit;
a plurality of electrodes within the laser tube connected to the discharge circuit for exciting the laser gas to produce a laser output beam, said discharge circuit including a solid state switch configured to switch between half and a quantity less than a voltage needed to produce desired pulse energies, the switch comprising a plurality of insulated gate bipolar transistors (IGBTs) including a parallel combination and each path of the parallel combination includes a single IGBT, and
wherein the discharge circuit includes a voltage doubling circuit configured to approximately double the voltage signal applied to a pulse compressor circuit before the pulse reaches the electrodes.

23. The laser of claim 22 wherein the solid state switch is configured to switch at least 10 kV.

24. The laser of claim 22, wherein the voltage doubling circuit includes a pair of capacitors.

25. The laser of claim 24 each of said pair of capacitors includes a plate connected to an output of the switch.

26. The laser of claim 25 wherein a second plate of a first of said pair of capacitors is coupled to the pulse compressor circuit and a second plate of a second of said pair of capacitors is coupled to a ground terminal.

27. The laser of claim 26, wherein the discharge circuit is configured such that when the switch closes, the pair of capacitors are each configured to acquire a voltage substantially equal to the voltage of a main initial storage capacitor charged prior to the switch being closed, and the sum of the voltages across the pair of capacitors being double the switching voltage such that the switching voltage is approximately half the voltage applied at the main laser discharge electrodes.

28. An excimer or molecular fluorine laser, comprising:
an oscillator laser tube filled with a laser gas;
an oscillator optical resonator;
an oscillator laser discharge circuit; and
a plurality of electrodes within the oscillator laser tube connected to the oscillator discharge circuit for exciting the laser gas in the oscillator laser tube to produce an oscillator laser output beam,
an amplifier laser tube filled with a laser gas;
an amplifier optical resonator;
a an amplifier laser discharge circuit; and
a plurality of electrodes within the amplifier laser tube connected to the amplifier discharge circuit for exciting the laser gas in the amplifier laser tube to produce an amplified laser output beam;
a solid state switch which is connected to each of the oscillator laser discharge circuit and the amplifier laser discharge circuit,
wherein an electrical delay circuit is coupled between the solid state switch and the amplifier laser discharge circuit, whereby an electrical pulse which is transmitted through the switch and applied to the amplifier laser discharge circuit is delayed from an electrical pulse applied to the oscillator laser discharge circuit;
wherein the oscillator laser output beam is optically directed into the amplifier laser tube of at a substantially same time as when an electrical pulse is applied to the electrodes connected to the amplifier discharge circuit; and
wherein the position of the oscillator laser output beam in the amplifier laser tube at the time of a discharge of the amplifier laser tube increases the output of the oscillator laser output beam to a desired level.

29. The laser of claim 28 wherein the voltage across the switch is substantially the same as the voltage applied to the discharge electrodes of the oscillator laser, and is less than the voltage required to produce the substantially similar level of output pulse energy of the oscillator laser without the amplifier pulse.

30. The laser of claim 28 wherein the switch includes a plurality of IGBTs.

31. The laser of claim 30, wherein the plurality of IGBTs includes a parallel combination and each path of the parallel combination includes a single IGBT.

32. An excimer or molecular fluorine laser, comprising:
an oscillator laser tube filled with a laser gas;
an oscillator optical resonator;
an oscillator discharge circuit; and
a plurality of electrodes within the oscillator laser tube connected to the oscillator discharge circuit for exciting the laser gas in the oscillator discharge circuit to produce an oscillator laser output beam,
an amplifier laser tube filled with a laser gas;
an amplifier optical resonator;
an amplifier laser discharge circuit; and
a plurality of electrodes within the amplifier laser tube connected to the amplifier discharge circuit for exciting the laser gas in the amplifier laser tube to produce an amplified laser output beam;
wherein a first solid state switch is connected to the oscillator laser discharge circuit and a second solid state switch is connected to the amplifier laser discharge circuit;
an electrical delay circuit connected to the second switch, whereby in response to a trigger signal the first switch applies an electrical pulse to the oscillator discharge circuit and the second switch applies an electrical pulse to the amplifier discharge circuit, and whereby the electrical pulse applied to the amplifier discharge circuit is delayed for an amount of time which corresponds to a delay caused by the electrical delay circuit;

wherein the oscillator laser output beam is optically directed into the amplifier laser tube at a substantially the same time as when an electrical pulse is applied to the electrodes connected to the amplifier discharge circuit; and wherein the oscillator laser output beam is amplified by a discharge in the amplifier laser tube.

33. The laser of claim 32 wherein the voltage across the first switch is substantially the same as the voltage applied to the electrodes of the oscillator laser, and less than the voltage required to produce the same output pulse energy of the oscillator laser without the amplifier pulse.

34. The laser of claim 33 wherein said first and second switches are synchronized such that said delay is controlled.

35. The laser of claim 32 wherein a trigger signal applied to each of the first and second solid state switches is delayed before the second solid state switch.

36. An excimer or molecular fluorine laser, comprising:
a laser tube configured to be filled with a laser gas;
an optical resonator; and
a plurality of discharge electrodes disposed within a discharge chamber, the chamber including a pair of discharge electrodes coupled to a discharge circuit for exciting the laser gas for generating a laser output beam, the discharge circuit including a solid state switch comprised of a plurality of insulated gate bipolar transistors (IGBTs) configured to switch a voltage signal of between 12 and 25 kV, the switch including a parallel combination and each path of the parallel combination includes a single IGBT.

37. The laser of claim 36 wherein the IGBTs have a rise time of less than 100 ns.

38. The laser of claim 37 further including a voltage doubling circuit configured to double the voltage signal applied to a pulse compressor circuit before the pulse reaches the discharge electrodes.

39. The laser of claim 38 wherein the voltage doubling circuit includes a pair of capacitors coupled in series.

40. The laser of claim 39 wherein each of said capacitors includes a plate connected to the output of the switch.

41. The laser of claim 36, wherein the plurality of IGBTs includes at least two IGBTs connected in series.

42. The laser of claim 36, wherein the plurality of IGBTs includes at least three series combinations of a single IGBT connected in parallel.

43. An excimer or molecular fluorine laser system, comprising:
an oscillator laser, including:
a first laser tube filled with a gas mixture including an active halogen component;
a first discharge circuit;
a first plurality of electrodes within the first laser tube connected to the first discharge circuit for energizing the gas mixture therein; and
a first optical resonator for generating a laser beam;
an amplifier, including:
a second laser tube filled with a similar gas mixture as said first laser tube;
a second discharge circuit;
a second plurality of electrodes within the second laser tube connected to the second discharge circuit for energizing the gas mixture therein;
a power supply;
a solid state switch for switching an electrical pulse provided by the power supply for providing the electrical pulse to each of the first and second discharge circuits; and a delay coupled between the switch and the second discharge circuit, such that laser pulses emitted by the oscillator laser are amplified within the amplifier laser tube, wherein the laser system provides output pulses of desired energies.

44. The laser system of claim 43, wherein the electrical pulses switched by the solid state switch are sufficient to provide output pulses of the laser system at the desired energies without a step-up transformer being disposed within the first discharge circuit.

45. The laser system of claim 43, wherein the first optical resonator includes a line-narrowing module for narrowing a bandwidth of emitted laser pulses.

46. An excimer or molecular fluorine laser system, comprising:
an oscillator laser, including:
a first laser tube filled with a gas mixture including an active halogen component;
a first power supply;
a first discharge circuit;
a first solid-state switch for switching electrical pulses provided by the first power supply;
a first plurality of electrodes within the first laser tube connected to the first discharge circuit for energizing the gas mixture therein; and
a first optical resonator for generating a laser beam;
an amplifier, including:
a second laser tube filled with a similar gas mixture as said first laser tube;
a second power supply;
a second discharge circuit;
a second solid state switch for switching electrical pulses provided by the second power supply;
a second plurality of electrodes within the second laser tube connected to the second discharge circuit for energizing the gas mixture therein,
wherein each of the first and second switches are configured to receive a trigger signal from a same trigger signal circuit, and the laser system further comprising a delay coupled between the trigger signal circuit and the second solid state switch, such that laser pulses emitted by the oscillator laser are amplified within the amplifier laser tube, wherein the laser system provides output pulses of desired energies.

47. The laser system of claim 46, wherein the electrical pulses switched by the first and second solid state switches are sufficient to provide output pulses of the laser system at the desired energies without a step-up transformer being disposed within the first discharge circuit.

48. The laser system of claim 46, wherein the first optical resonator includes a line-narrowing module for narrowing a bandwidth of emitted laser pulses.

49. An excimer or molecular fluorine laser, comprising:
a laser tube filled with a laser gas;
an optical resonator;
a discharge circuit;
a plurality of electrodes within the laser tube connected to the discharge circuit for exciting the laser gas to produce a laser output beam,
wherein said discharge circuit includes a solid state switch, and
wherein said switch includes a series combination of at least two IGBTs, said series combination being connected in parallel with a single additional IGBT.

* * * * *